(12) United States Patent
Sanjabi et al.

(10) Patent No.: US 10,331,485 B2
(45) Date of Patent: Jun. 25, 2019

(54) METHOD AND SYSTEM FOR MEETING MULTIPLE SLAS WITH PARTIAL QOS CONTROL

(71) Applicants: Sam Sanjabi, Toronto (CA); Chong Chen, Richmond Hill (CA); Reza Pournaghi, North York (CA); Shane Anthony Bergsma, East York (CA); Wei Pei, Markham (CA)

(72) Inventors: Sam Sanjabi, Toronto (CA); Chong Chen, Richmond Hill (CA); Reza Pournaghi, North York (CA); Shane Anthony Bergsma, East York (CA); Wei Pei, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 150 days.

(21) Appl. No.: 15/607,721

(22) Filed: May 30, 2017

(65) Prior Publication Data

US 2018/0143858 A1    May 24, 2018

Related U.S. Application Data

(60) Provisional application No. 62/423,894, filed on Nov. 18, 2016.

(51) Int. Cl.
*G06F 9/50* (2006.01)
*H04L 29/08* (2006.01)
(Continued)

(52) U.S. Cl.
CPC ........... *G06F 9/5011* (2013.01); *G06Q 10/06* (2013.01); *H04L 29/08* (2013.01); *H04L 47/805* (2013.01);
(Continued)

(58) Field of Classification Search
None
See application file for complete search history.

(56) References Cited

U.S. PATENT DOCUMENTS 7,519,725 B2   4/2009   Alvarez et al.
7,774,457 B1   8/2010   Talwar et al.
(Continued)

FOREIGN PATENT DOCUMENTS

CN    101068227 A    11/2007
CN    101072183 A    11/2007
(Continued)

OTHER PUBLICATIONS

International Search Report issued in PCT application No. PCT/CN2017/096235.
(Continued)

*Primary Examiner* — Natisha D Cox
(74) *Attorney, Agent, or Firm* — Norton Rose Fulbright Canada LLP

(57) ABSTRACT

A first quality of service identifier is assigned to each subtask associated with each node of a compute workflow, the first quality of service identifier indicative of a level of quality of service associated with each node. A planned resource requirement is assigned to each subtask, the planned resource requirement indicative of a total amount of system resources required to complete each subtask. A resource allocation plan is generated for each subtask, the resource allocation plan indicative of a distribution of the system resources over time in at least one resource manager. The resource allocation plan and the first quality of service identifier are output to the at least one resource manager for enforcement of the level of quality of service on one or more jobs submitted for each node through at least one workflow orchestrator external to the at least one resource manager.

22 Claims, 18 Drawing Sheets

(51) Int. Cl.
  *G06Q 10/06* (2012.01)
  *H04L 12/927* (2013.01)
  *G06F 1/329* (2019.01)
  *G06F 9/455* (2018.01)
  *H04L 12/851* (2013.01)
  *H04W 36/38* (2009.01)

(52) U.S. Cl.
  CPC .... *G06F 1/329* (2013.01); *G06F 2009/45583* (2013.01); *H04L 47/24* (2013.01); *H04W 36/385* (2013.01)

(56) References Cited

U.S. PATENT DOCUMENTS

| | | |
|---|---|---|
| 2012/0054768 A1 | 3/2012 | Kanna et al. |
| 2013/0157679 A1 | 6/2013 | Van Phan et al. |
| 2013/0231081 A1* | 9/2013 | Mo ............... H04L 41/5067 455/405 |
| 2014/0074905 A1 | 3/2014 | Schincariol et al. |
| 2014/0244920 A1 | 8/2014 | Biswas et al. |
| 2016/0205202 A1* | 7/2016 | Jia ..................... G06Q 30/04 705/40 |

FOREIGN PATENT DOCUMENTS

| | | |
|---|---|---|
| CN | 103914754 A | 7/2014 |
| CN | 104239141 A | 12/2014 |
| CN | 104378309 A | 2/2015 |
| CN | 104735798 A | 6/2015 |
| CN | 104991830 | 10/2015 |
| CN | 105897864 A | 8/2016 |
| EP | 3038291 A1 | 6/2016 |
| JP | 2015534674 A | 12/2015 |
| KR | 20120082598 A | 7/2012 |
| WO | 2010131778 A1 | 11/2010 |

OTHER PUBLICATIONS

Carlo Curino, Djellel E. Difallah, Chris Douglas, Subru Krishnan, Raghu Ramakrishnan, and Sriram Rao. 2014. Reservation-based Scheduling: If You're Late Don't Blame Us!. In Proceedings of the ACM Symposium on Cloud Computing (SOCC '14). ACM, New York, NY, USA, , Article 2 , 14 pages. DOI=http://dx.doi.org/10.1145/2670979.2670981.

Alexey Tumanov, Timothy Zhu, Jun Woo Park, Michael A. Kozuch, Mor Harchol-Balter, and Gregory R. Ganger. 2016. TetriSched: global rescheduling with adaptive plan-ahead in dynamic heterogeneous clusters. In Proceedings of the Eleventh European Conference on Computer Systems (EuroSys '16). ACM, New York, NY, USA, , Article 35 , 16 pages. DOI=http://dx.doi.org/10.1145/2901318.2901355.

Fabio Rodrigues de la Rocha et al, Strategies for QoS Improvement on the Time-Interval Scheduling. SAC'08 Mar. 16-20, 2008, Fortaleza, Ceara, Brazil, pp. 320-321.

Dang Minh Quan, Mapping heavy communication Workfows onto Grid Resources within an SLA context. Proceeding HPCC"06 Proceedings of the Second international conference on High Performance Computing and Communications, pp. 727-736.

* cited by examiner

METHOD AND SYSTEM FOR MEETING MULTIPLE SLAS WITH PARTIAL QOS CONTROL

CROSS-REFERENCE TO RELATED APPLICATIONS

The present application claims priority under 35 U.S.C. 119(e) of Provisional patent application bearing Ser. No. 62/423,894 filed on Nov. 18, 2016, the contents of which are hereby incorporated by reference.

FIELD

Embodiments described herein generally relate to the field of workflow management, more particularly to ensuring quality of service in a compute workflow.

BACKGROUND

In enterprise data analytics systems, customers typically have repeatable, complex, and inter-dependent business workflows which have an impact on the operation of various control systems. Services are provided to the customers by building large clusters of nodes to concurrently run several tasks. Because different customers may have different requirements and data processing needs, a particular service level may be provided to a given customer in accordance with a formally negotiated service level agreement (SLA). The SLA typically specifies particular aspects of the service, such as availability, serviceability, performance, and operation. Penalties may also be specified in the event of violations of the SLA.

In some workflows, top-level nodes have strict deadlines that must be met, with different nodes typically having different deadlines. In addition, nodes may depend on common ancestors and delays at given nodes may affect remaining nodes, causing the overall system SLA to be potentially missed. However, this issue can only be partially controlled by improving service to nodes because some control systems do not have quality of service (QoS) control procedures to expedite tasks if delays are experienced.

There is therefore a need for an improved system and method for ensuring QoS in a compute workflow.

SUMMARY

In accordance with one aspect, there is provided a method for ensuring quality of service in a compute workflow. The method comprises, at a planning unit, assigning a first quality of service identifier to each of one or more subtasks associated with each node of the compute workflow, the first quality of service identifier indicative of a level of quality of service assigned to each node, assigning a planned resource requirement to each of the one or more subtasks, the planned resource requirement indicative of a total amount of system resources required to complete each of the one or more subtasks, generating a resource allocation plan for each of the one or more subtasks having the first quality of service identifier and the planned resource requirement assigned thereto, the resource allocation plan indicative of a distribution of the system resources over time in at least one resource manager, and outputting the resource allocation plan and the first quality of service identifier to the at least one resource manager for enforcement of the level of quality of service on one or more jobs submitted for each node through at least one workflow orchestrator external to the at least one resource manager, each of the one or more jobs comprising the one or more subtasks.

In some example embodiments, the method may comprise retrieving, from the at least one workflow orchestrator and from the at least one resource manager, execution information indicative of a current progress of the one or more subtasks and of the one or more jobs, determining from the execution information an actual resource requirement for each of the one or more subtasks, comparing the actual resource requirement to the planned resource requirement, and dynamically adjusting the resource allocation plan of at least one of the one or more subtasks if the actual resource requirement differs from the planned resource requirement.

In some example embodiments, the method may comprise, at the planning unit, receiving, from the at least one workflow orchestrator, input data comprising a number of nodes in the compute workflow, dependencies between nodes, and metadata for each node, the metadata comprising a node identifier, one or more deadlines for each node, one or more commands executed by each node, and a resource requirement estimate for each node, wherein the one or more subtasks are identified based on the input data.

In some example embodiments, the method may comprise, at the planning unit, performing a syntactical analysis of the one or more commands to identify ones of the one or more commands that impact operation of the at least one resource manager, and sequentially assigning a number to each of the identified commands, the first quality of service identifier comprising the node identifier and the assigned number.

In some example embodiments, the method may comprise, at the planning unit, predicting the one or more subtasks based on a past execution history for each node, and sequentially assigning a number to each of the predicted one or more subtasks, the first quality of service identifier comprising the node identifier and the assigned number.

In some example embodiments, assigning the planned resource requirement may comprise, at the planning unit, dividing the resource requirement estimate uniformly between the one or more subtasks.

In some example embodiments, assigning the planned resource requirement may comprise, at the planning unit, predicting the planned resource requirement for each of the one or more subtasks based on a past execution history for each node.

In some example embodiments, assigning the planned resource requirement may comprise, at the planning unit, executing each of the one or more subtasks for a predetermined period of time, terminating each of the one or more subtasks upon expiry of the predetermined period of time, obtaining a current resource usage sample for each of the one or more subtasks upon termination of each of the one or more subtasks, and modelling the planned resource requirement based on the current resource usage sample.

In some example embodiments, the method may comprise, at the planning unit, identifying uncontrolled ones of the one or more subtasks, each uncontrolled subtask associated with an unknown workflow, and assigning the planned resource requirement may comprise, at the planning unit, setting the total amount of system resources required to complete each uncontrolled subtask to zero and modeling the uncontrolled subtask as having a non-zero duration.

In some example embodiments, generating the resource allocation plan may comprise, at the planning unit, choosing an order in which to assign resource allocations to each of the one or more subtasks, choosing a resource allocation over time for each of the one or more subtasks, and choosing a start time for each of the one or more subtasks.

In some example embodiments, the method may comprise, at the planning unit, identifying ones of the one or more subtasks having violated the one or more deadlines, adding the identified subtasks to a subtask reject list, and outputting the subtask reject list.

In some example embodiments, the method may comprise, at a job submitter, assigning to each of the one or more jobs a second quality of service identifier indicative of a requested level of quality of service for each node, and, at the at least one resource manager, receiving the first quality of service identifier, the second quality of service identifier, and the resource allocation plan and allocating the system resources in accordance with the resource allocation plan for ones of the one or more jobs for which the second quality of service identifier corresponds to the first quality of service identifier.

In some example embodiments, assigning the second quality of service identifier may comprise observing an order of the one or more jobs and assigning a number to each of the one or more jobs in accordance with the order, the second quality of service identifier comprising the assigned number and a node identifier.

In accordance with another aspect, there is provided a system for ensuring quality of service in a compute workflow. The system comprises at least one processing unit and a non-transitory memory communicatively coupled to the at least one processing unit and comprising computer-readable program instructions executable by the at least one processing unit for assigning a first quality of service identifier to each of one or more subtasks associated with each node of the compute workflow, the first quality of service identifier indicative of a level of quality of service assigned to each node, assigning a planned resource requirement to each of the one or more subtasks, the planned resource requirement indicative of a total amount of system resources required to complete each of the one or more subtasks, generating a resource allocation plan for each of the one or more subtasks having the first quality of service identifier and the planned resource requirement assigned thereto, the resource allocation plan indicative of a distribution of the system resources over time in at least one resource manager, and outputting the resource allocation plan and the first quality of service identifier to the at least one resource manager for enforcement of the level of quality of service on one or more jobs submitted for each node through at least one workflow orchestrator external to the at least one resource manager, each of the one or more jobs comprising the one or more subtasks.

In some example embodiments, the computer-readable program instructions may be executable by the at least one processing unit for retrieving, from the at least one workflow orchestrator and from the at least one resource manager, execution information indicative of a current progress of the one or more subtasks and of the one or more jobs, determining from the execution information an actual resource requirement for each of the one or more subtasks, comparing the actual resource requirement to the planned resource requirement, and dynamically adjusting the resource allocation plan of at least one of the one or more subtasks if the actual resource requirement differs from the planned resource requirement.

In some example embodiments, the computer-readable program instructions may be executable by the at least one processing unit for receiving from the at least one workflow orchestrator a node identifier for each node and one or more commands executed by each node, performing a syntactical analysis of the one or more commands to identify ones of the one or more commands that impact operation of the at least one resource manager, and sequentially assigning a number to each of the identified commands, the first quality of service identifier comprising the node identifier and the assigned number.

In some example embodiments, the computer-readable program instructions may be executable by the at least one processing unit for receiving from the at least one workflow orchestrator a node identifier and a past execution history for each node, predicting the one or more subtasks based on the past execution history, and sequentially assigning a number to each of the predicted one or more subtasks, the first quality of service identifier comprising the node identifier and the assigned number.

In some example embodiments, the computer-readable program instructions may be executable by the at least one processing unit for identifying uncontrolled ones of the one or more subtasks, each uncontrolled subtask associated with an unknown workflow, and for assigning the planned resource requirement comprising setting the total amount of system resources required to complete each uncontrolled subtask to zero and modeling the uncontrolled subtask as having a non-zero duration.

In some example embodiments, the computer-readable program instructions may be executable by the at least one processing unit for generating the resource allocation plan comprising choosing an order in which to assign resource allocations to each of the one or more subtasks, choosing a resource allocation over time for each of the one or more subtasks, and choosing a start time for each of the one or more subtasks.

In some example embodiments, the computer-readable program instructions may be executable by the at least one processing unit for assigning to each of the one or more jobs a second quality of service identifier indicative of a requested level of quality of service for each node and allocating the system resources in accordance with the resource allocation plan for ones of the one or more jobs for which the second quality of service identifier corresponds to the first quality of service identifier.

In some example embodiments, the computer-readable program instructions may be executable by the at least one processing unit for assigning the second quality of service identifier comprising observing an order of the one or more jobs and assigning a number to each of the one or more jobs in accordance with the order, the second quality of service identifier comprising the assigned number and a node identifier.

In accordance with another aspect, there is provided a computer readable medium having stored thereon program code executable by a processor for assigning a first quality of service identifier to each of one or more subtasks associated with each node of a compute workflow, the first quality of service identifier indicative of a level of quality of service associated with each node, assigning a planned resource requirement to each of the one or more subtasks, the planned resource requirement indicative of a total amount of system resources required to complete each of the one or more subtasks, generating a resource allocation plan for each of the one or more subtasks having the quality of service identifier and the planner resource requirement assigned thereto, the resource allocation plan indicative of a distribution of the system resources over time in at least one resource manager, and outputting the resource allocation plan and the first quality of service identifier to the at least one resource manager for enforcement of the level of quality of service on one or more jobs submitted for each node through at least one workflow orchestrator external to the at least one resource manager, each of the one or more jobs comprising the one or more subtasks.

Many further features and combinations thereof concerning the present improvements will appear to those skilled in the art following a reading of the instant disclosure.

DESCRIPTION OF THE FIGURES

In the figures.

It will be noted that throughout the appended drawings, like features are identified by like reference numerals.

DETAILED DESCRIPTION

Figure 1A:
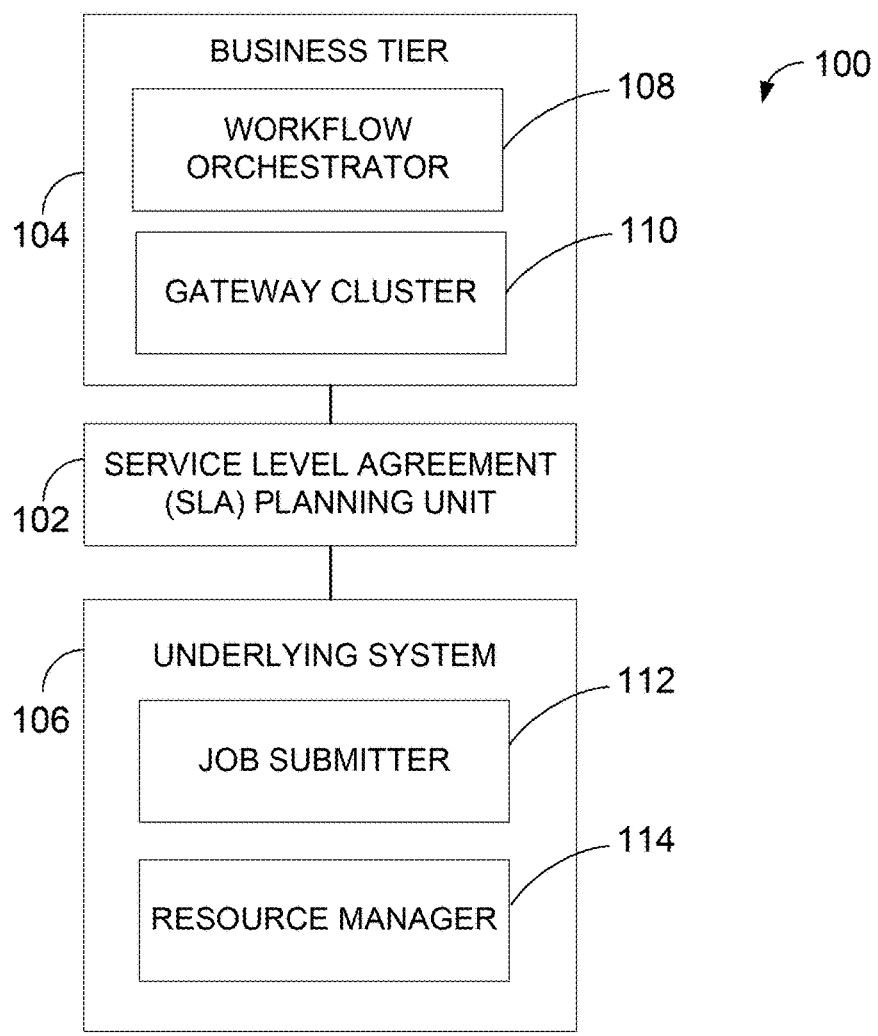
FIG. 1A is a block diagram of an example system for ensuring quality of service in a compute workflow, in accordance with one embodiment.

Referring to FIG. 1A, an example system 100 for ensuring quality of service (QoS) in a compute workflow, in accordance with one embodiment, will now be described. The system 100 comprises a service level agreement (SLA) planning unit 102, which is provided as an intermediate layer between a business tier 104 and an underlying system 106. The business tier 104 comprises a workflow orchestrator 108 that organizes and orchestrates activities on a plurality of connected computers (referred to generally as nodes, not shown) of a gateway cluster 110. Examples of the workflow orchestrator 108 include, but are not limited to, Oozie, Control-M, and Azkaban.

The underlying system 106 may comprise systems (referred to herein as control systems) that have QoS features and systems (referred to herein as uncontrolled systems) that cannot be controlled and for which it is desirable to model resources to zero, as will be discussed further below. Examples of control systems include, but are not limited to, Yet Another Resource Negotiator (YARN)-based data processing applications. Examples of uncontrolled systems include, but are not limited to, legacy databases, data transfer services, and file system operations. The underlying system 106 comprises a job submitter 112 and a resource manager 114. As will be discussed further below, the job submitter 112 submits jobs to the resource manager 114, the submitted jobs resulting from action(s) performed by the workflow orchestrator 108. Examples of the job submitter 112 include, but are not limited to, Hive, Pig, Oracle, TeraData, File Transfer Protocol (FTP), Secure Shell (SSH), HBase, and Hadoop Distributed File System (HDFS).

The resource manager 114 receives jobs submitted by the job submitter 112 and distributes the submitted jobs on available control system resources. As used herein, the term QoS refers to a level of resource allocation or resource prioritization for a job being executed. The resource manager 114 more particularly enforces system resource allocation decisions made by the SLA planning unit 102 on actual workload (e.g. underlying control system jobs generated by business tier actions, as will be discussed further below), thereby making tasks run faster or slower. The system resources referred to herein include, but are not limited to, Central Processing Unit (CPU) usage, Random Access Memory (RAM) usage, and network bandwidth usage. It should be understood that the resource manager 114 may be any underlying system that is enabled with a QoS enforcement scheme. As such, the resource manager 114 may comprise, but is not limited to, a scheduler (e.g. YARN, Mesos, Platform Load Sharing Facility (LSF), GridEngine, Kubernetes, or the like), and a data warehouse system enabled with features to enforce QoS (e.g. Relational Database Management System (RDBMS) or the like).

Figure 1B:
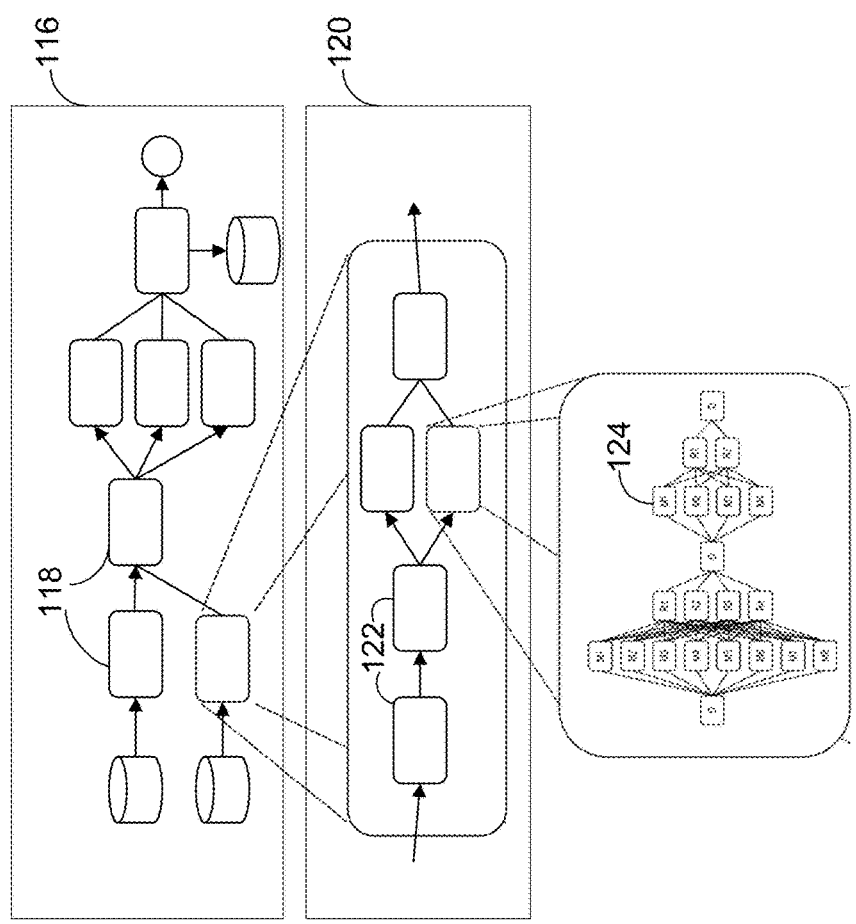
FIG. 1B is a schematic diagram of a compute workflow, in accordance with one embodiment.
Figure 1C:
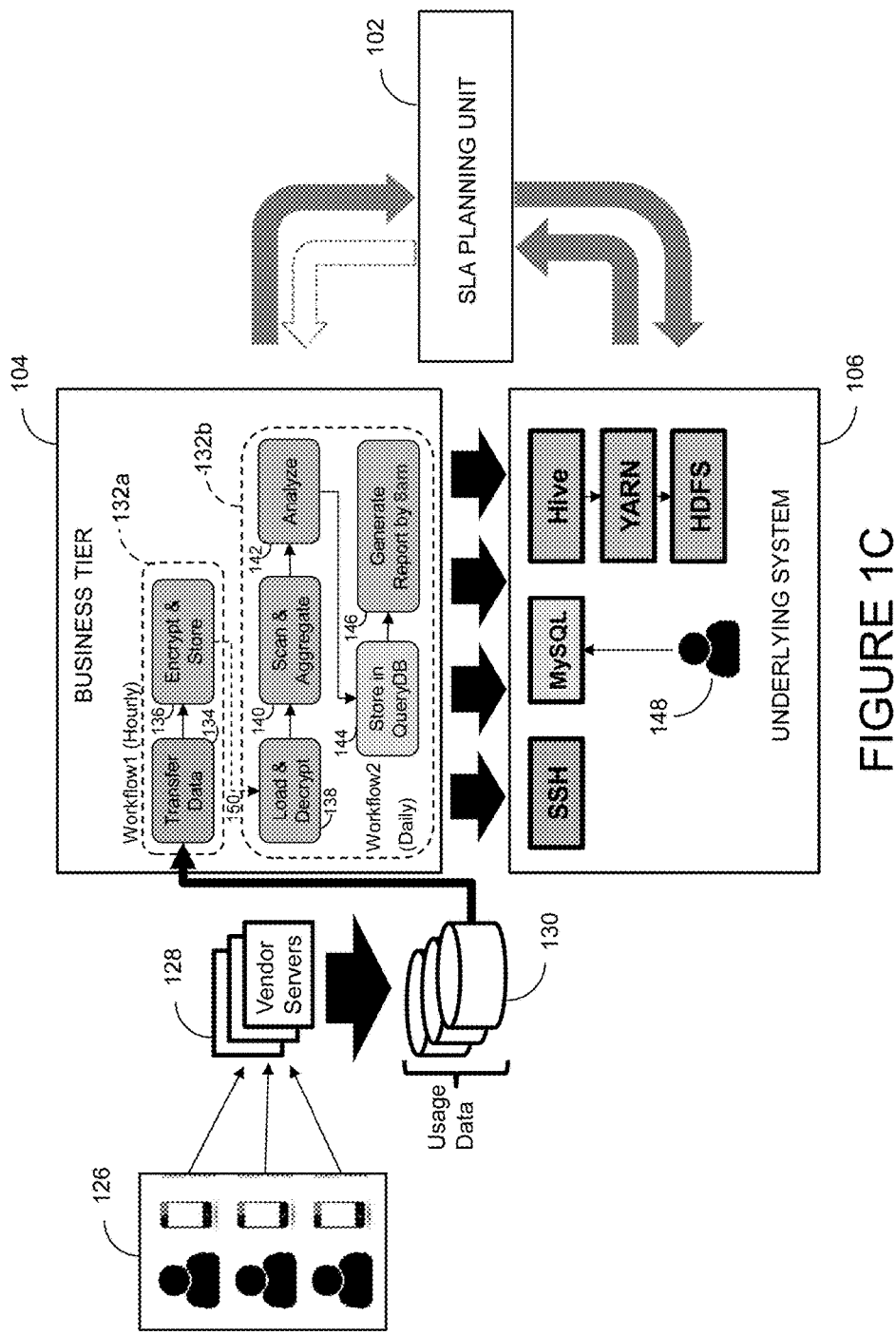
FIG. 1C is a schematic diagram of the system of FIG. 1A applied to a mobile handset vendor environment, in accordance with one embodiment.

Referring now to FIG. 1B in addition to FIG. 1A, the workflow orchestrator 108 encapsulates business logic (e.g. as specified by a business user) into a business tier workflow 116 (e.g. a workflow graph), manages repeatable workload, and ensures continuous processing. As used herein, the term business tier workflow refers to a set of interdependent business tier actions (also referred to herein as actions) 118 defined by a business user (e.g. a user of the workflow orchestrator 108). Deadlines are typically defined at the workflow level, which in turn imposes strict SLAs (including, but not limited to, completion deadlines) on some jobs. In particular, the business user defines business tier actions and their interdependencies, thereby creating business tier workflows as in 116. Each business tier action 118 is a single action in the business tier workflow 116 defined by the business user, may depend on the completion of one or more other business tier actions 118, and may run on one of the gateway cluster nodes. A Hive query is an example of a business tier action.

The actions of the workflow orchestrator 108 (e.g. the business tier actions 118) result in the submission of jobs to be processed by the gateway cluster 110. The gateway cluster 110 distributes the submitted jobs to various underlying systems, such as the underlying system 106. In some embodiments, the gateway cluster 110 is under the control of the workflow orchestrator 108. In other embodiments, the gateway cluster 110 is not under the control of the workflow orchestrator 108.

In particular, a single business tier action 118 may implement a control system workflow 120, e.g. a set of interdependent control system jobs (also referred to herein as jobs) 122. Each control system job 122 is then submitted to the underlying system 106 to perform a single step of the control system workflow 120. In the MapReduce framework, an example of a control system job 122 is a Map/Reduce job submitted by Hive to YARN. The underlying system 106 receives from the business tier 104 control system jobs 122 to be processed and accordingly generates its own workload (i.e. a subflow of control system tasks 124, referred to herein as underlying subtasks), which is distributed to available control system resources for execution. In particular, each control system job 122 is divided into one or more underlying subtasks 124 whose nature and structure depends on the application used by the corresponding business tier job action to perform its work. Each subtask 124 represents a basic unit of work that is executed by the control system resource manager 114 as part of a control system job 122, the control system job 122 running as a single process on a given control system resource. For example, in the MapReduce framework, a subtask may be a single Map task or Reduce task working on one block of data. In other words, subtasks 124 can be seen as individual compute containers that run on a cluster for a period of time, such that the collective output of a group of subtasks 124 operating in parallel accomplishes the goals of a given control system job 122.

Figure 10:
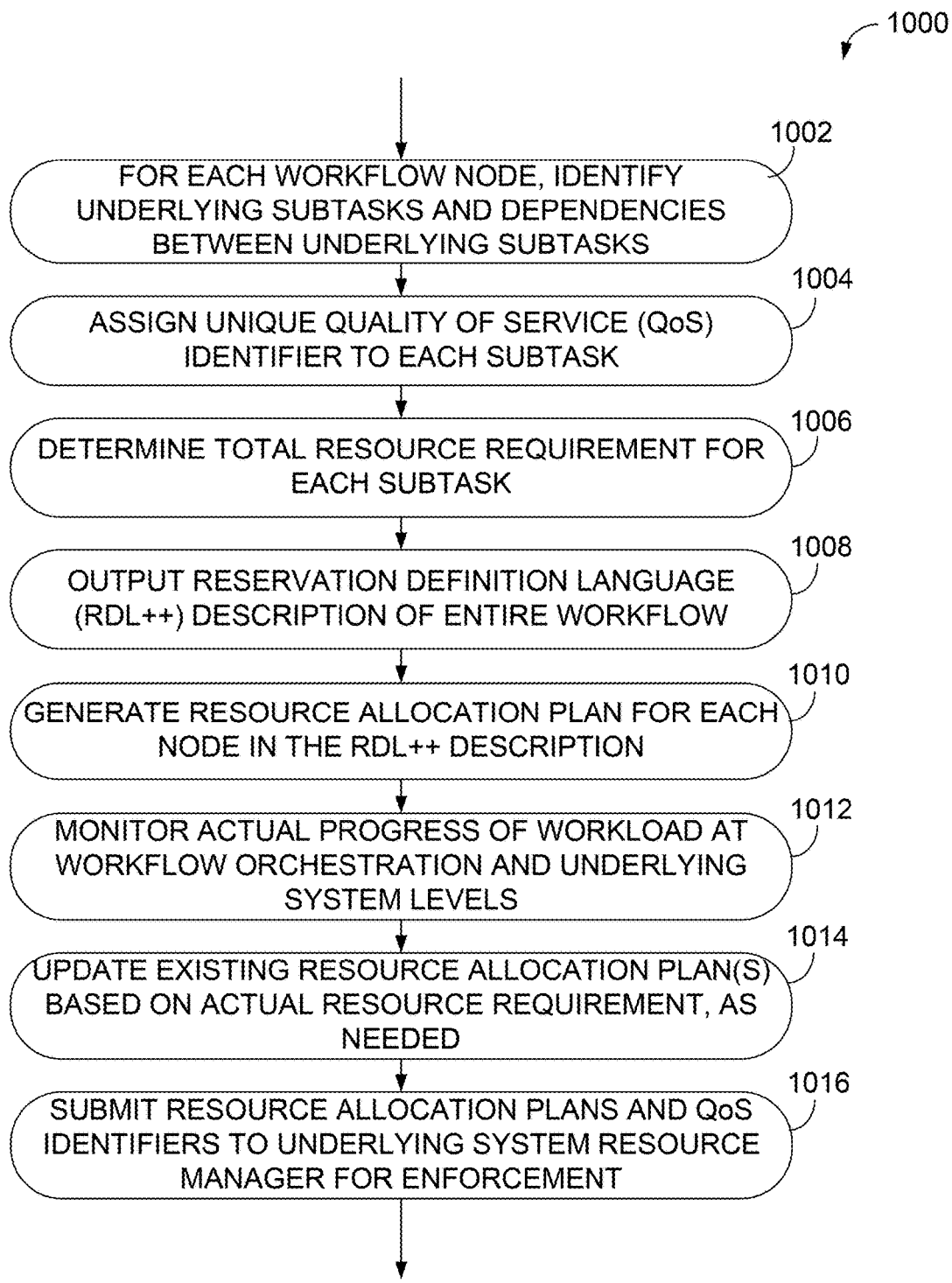
FIG. 10 illustrates a flowchart of an example method for ensuring quality of service in a compute workflow, in accordance with one embodiment.

Referring now to FIG. 10, an example embodiment of the system 100 will now be described with reference to a mobile handset vendor environment. In the illustrated embodiment, a plurality of mobile handset users 126 interact with a plurality of mobile handset vendor servers 128, e.g. by making purchases on an online store of a mobile handset vendor, searching online for products of the mobile handset vendor, or the like. The interactions between the mobile handset users 126 and the mobile handset vendor servers 128 in turn generate usage data that is stored in a suitable memory, such as databases 130, in any suitable format, including, but not limited to, log files. It may be desirable for the mobile handset vendor to leverage the usage data for business purposes, e.g. to better understand customers, customize offerings, choose future investment directions, measure product uptake or performance, and the like. For this purpose, the usage data may be analyzed using a set of workflows defined in and executed by a workflow orchestrator (reference 108 in FIG. 1A) provided at the business tier 104. In the illustrated embodiment, a first workflow 132a and a second workflow 132b are defined and executed at the business tier 104.

The first workflow 132a is a two-step workflow comprising a step 134 of transferring the usage data from a source (e.g. from the databases 130) using any suitable means (e.g. SSH) and a step 136 of encrypting and storing the transferred data (e.g. on HDFS). The first workflow 132a is run on a regular basis (e.g. hourly) in order to ensure the freshness of imported datasets. The output of the workflow 132a may be shared by all business units (not shown) within the business tier 104, with each business unit having different permission levels on the data and different requirements for the analysis that they wish to conduct on the data. The second workflow 132b is also run on a regular basis (e.g. daily) and comprises a step 138 of decrypting data stored by the first workflow 132a and loading the decrypted data into a suitable format for use by an analysis engine (e.g. Hive) that will compute a desired result. The next step 140 is to scan the loaded and decrypted data (e.g. Hive tables) and perform an aggregation operation on the scanned data. An analysis operation is then performed on the aggregated tables at step 142 and the resulting data is stored at step 144 into a query database (e.g. MySQL) for future use. A report is then generated at step 146 at regular intervals (e.g. daily) for use by business unit leaders, or the like. In the illustrated embodiment, the step 146 of generating the report is to be performed by a hard deadline (e.g. 8 AM) every day. Execution of the workflows 132a and 132b results in jobs being submitted to the underlying system 106. For example, the report generated at step 146 is consumed by a business unit leader 148 residing in the underlying system 106 and the data stored at step 136 may be queried by the business unit leader 148 (or any other entity, such as data analysts) on an ad-hoc basis to perform finer grained analysis not covered by the daily tasks performed by the workflow 132b.

It should be understood that the type of workflow 132a, 132b defined at the business tier 104 is specific to the business unit to which the data is provided, each business unit having its own version of the workflow 132a, 132b on which analysis operations are performed. Each workflow 132a, 132b may also have a different deadline or run on a different period. Still, in the illustrated embodiment, all workflows share a dependency with the first workflow 132a (as shown by arrow 150). Moreover, each business unit submitting its workflow (e.g. jobs) to the underlying system 106 may have a different priority level or a different share of the underlying compute infrastructure. It is therefore desirable to ensure that all jobs are completed as required by the different business units.

Referring back to FIG. 1A in addition to FIG. 10, as will be discussed further below, the SLA planning unit 102 is an entity that interfaces with the business tier 104 and the underlying system 106 to ensure that jobs within the compute workflow are completed to the specifications and/or requirements set forth by the user (e.g. that the deadlines and SLAs of higher-level workflows are met). For this purpose, the SLA planning unit 102 decides the manner in which system resources should be adjusted. In particular, in order to ensure that critical workflows at the business tier level meet their deadlines and SLAs, the SLA planning unit 102 the SLA planning unit 102 determines the total resource requirement for completing a given control system job as well as the manner in which resources should be allocated over time to different tasks, as will be discussed further below. In one embodiment, the SLA planning unit 102 can choose to run a given job as fast as possible by giving the job the maximum resources it can leverage. In another embodiment, the SLA planning unit 102 can choose to give a given job as few resources as possible while still being able to meet the SLA. The SLA planning unit 102 then transmits the resource allocation decisions to the resource manager 114 for enforcement on the actual submitted workload. In particular, the SLA planning unit 102 instructs the underlying system 106 to allocate resources in the manner determined by the SLA planning unit 102 whenever jobs arrive at the underlying system 106.

It should be understood that, although the SLA planning unit 102 is illustrated and described herein as interfacing with a single workflow orchestrator 108, the SLA planning unit 102 may simultaneously interface with multiple workflow orchestrators. It should also be understood that, although the SLA planning unit 102 is illustrated and described herein as interfacing with a single underlying system 106, the SLA planning unit 102 may simultaneously interface with multiple underlying systems.

Figure 2:
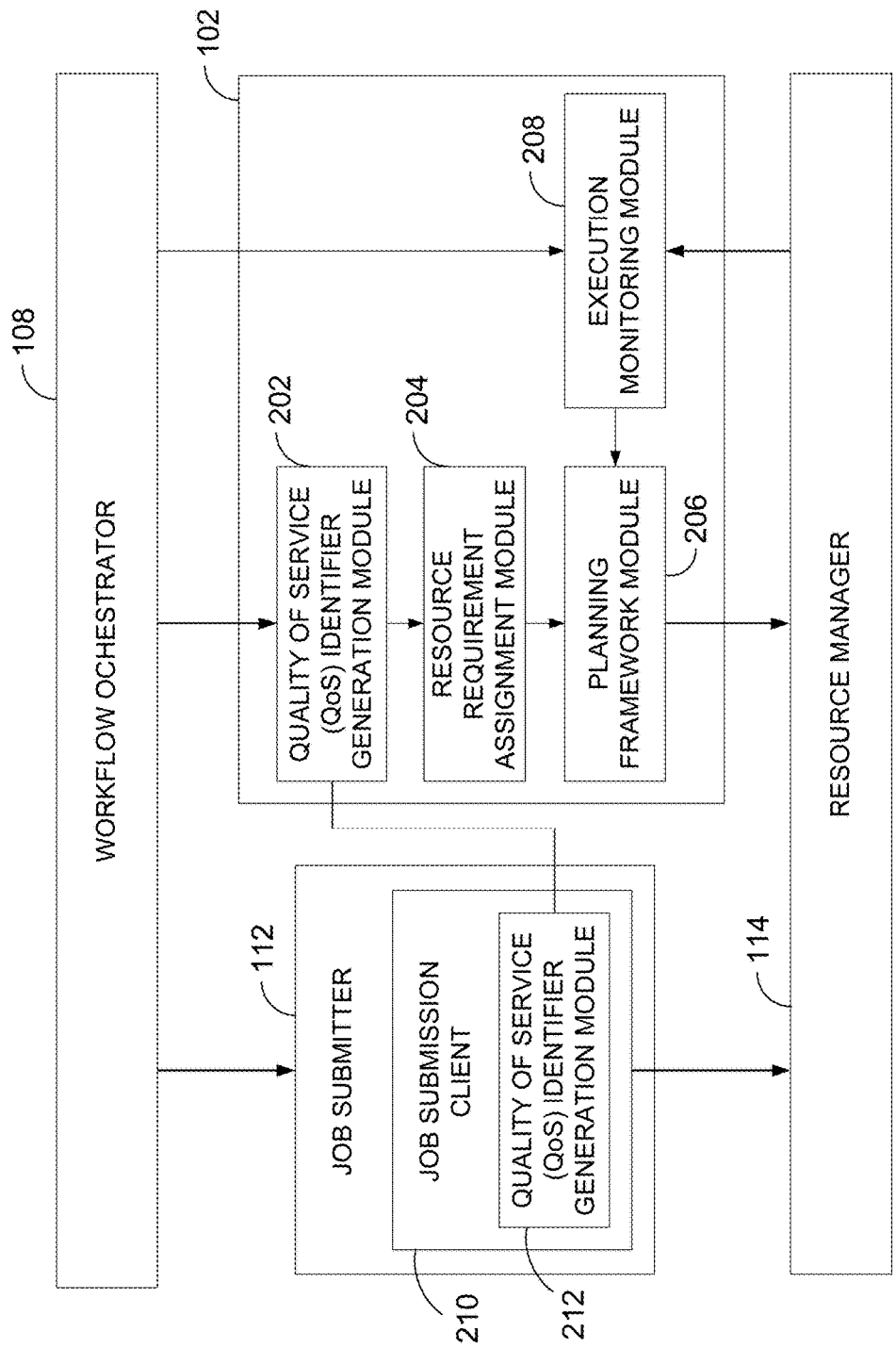
FIG. 2 is a detailed block diagram of the system of FIG. 1A.

FIG. 2 illustrates an example embodiment of the SLA planning unit 102. The SLA planning unit 102 comprises a QoS identifier generation module 202, a resource requirement assignment module 204, a planning framework module 206, and an execution monitoring module 208. The job submitter 112 comprises a job submission client 210, which in turn comprises a QoS identifier generation module 212.

As will be discussed further below, the QoS identifier generation module 202 provided in the SLA planning unit 102 (referred to herein as "SLA QoS identifier generation module") discovers, for each workflow (e.g. gateway cluster) node, the underlying subtasks, which are associated with the node. The SLA planning unit 102 also discovers the dependencies between the underlying subtasks. The SLA QoS identifier generation module 202 then generates a unique QoS identifier for each subtask of a given node. The QoS identifier generation module 212 provided in the job submission client 210 runs a complementary procedure that generates the same QoS identifiers as those generated by the SLA QoS identifier generation module 202. As used herein, the term QoS identifier refers to a credential used by a user of a controllable system to reference the level of QoS that they have been assigned.

The resource requirement assignment module 204 then determines and assigns a resource requirement for each subtask of the given node and the planning framework module 206 accordingly generates a resource allocation plan for each subtask having a resource requirement and a QoS identifier. As used herein, the term resource requirement refers to the total amount of system resources required to complete a job in the underlying system (reference 106 in FIG. 1A) as well as the number of pieces the total amount of resources can be broken into in the resource and time dimension. The term resource allocation plan refers to the manner in which required system resources are distributed over time.

The execution monitoring module 208 monitors the actual progress of the workload at both the workflow orchestration and the underlying system levels and reports the progress information to the planning framework module 206. Using the progress information, the planning framework module 206 dynamically adjusts previously-generated resource allocation plans as needed in order to ensure that top-level deadlines and SLAs are met. As will be discussed below with reference to FIG. 8, the adjustment may comprise re-planning all subtasks or re-planning individual subtasks to stay on schedule locally. In one embodiment, at least one of an order in which to assign resource allocations to one or more subtasks, a shape (i.e. a resource allocation over time) of one or more subtasks, and a placement (i.e. a start time) of one or more subtasks is adjusted. For example, the planning framework module 206 may provide more CPU power supply voltage (or VCORE) for a given control system job in order to make the job run faster. The planning framework module 206 may also make the given control system job start earlier if the jobs depending on the given control system job are completed.

Figure 3:
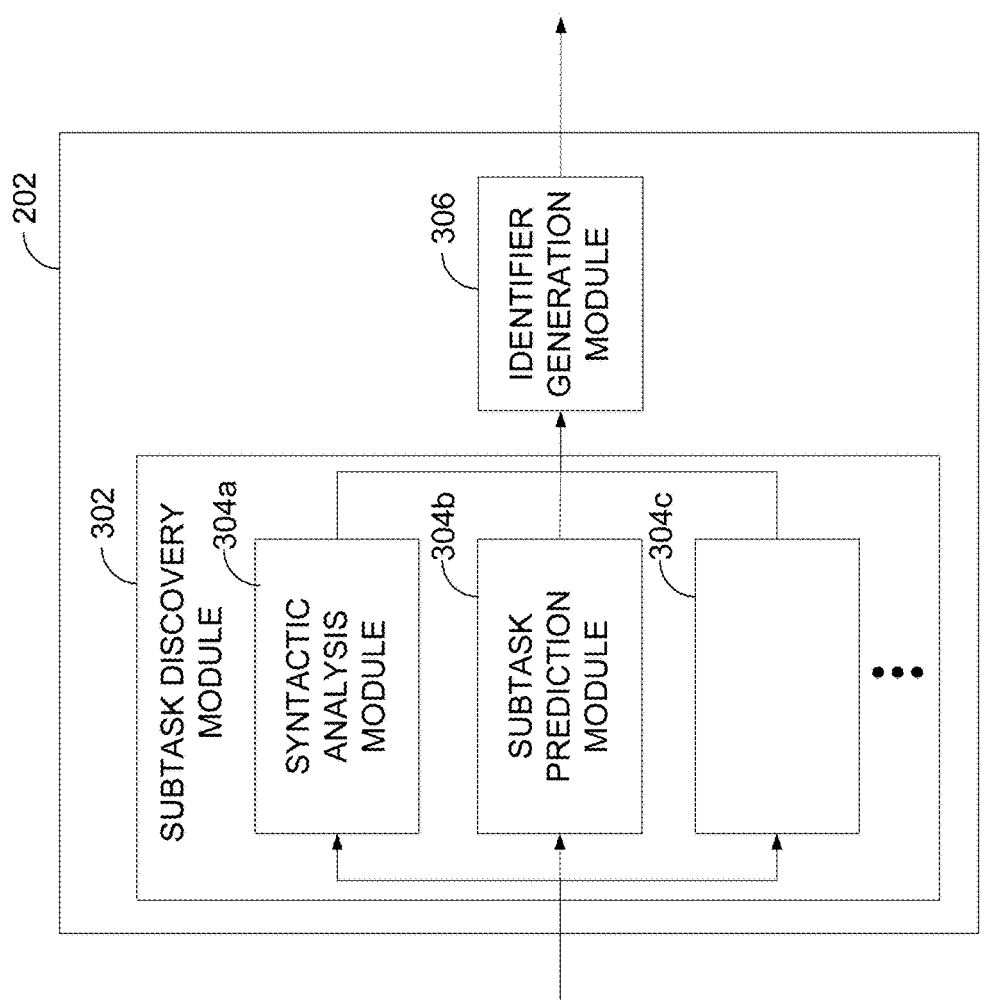
FIG. 3 is a block diagram of the QoS identifier generation module provided in the SLA planning unit of FIG. 2.
Figure 4:
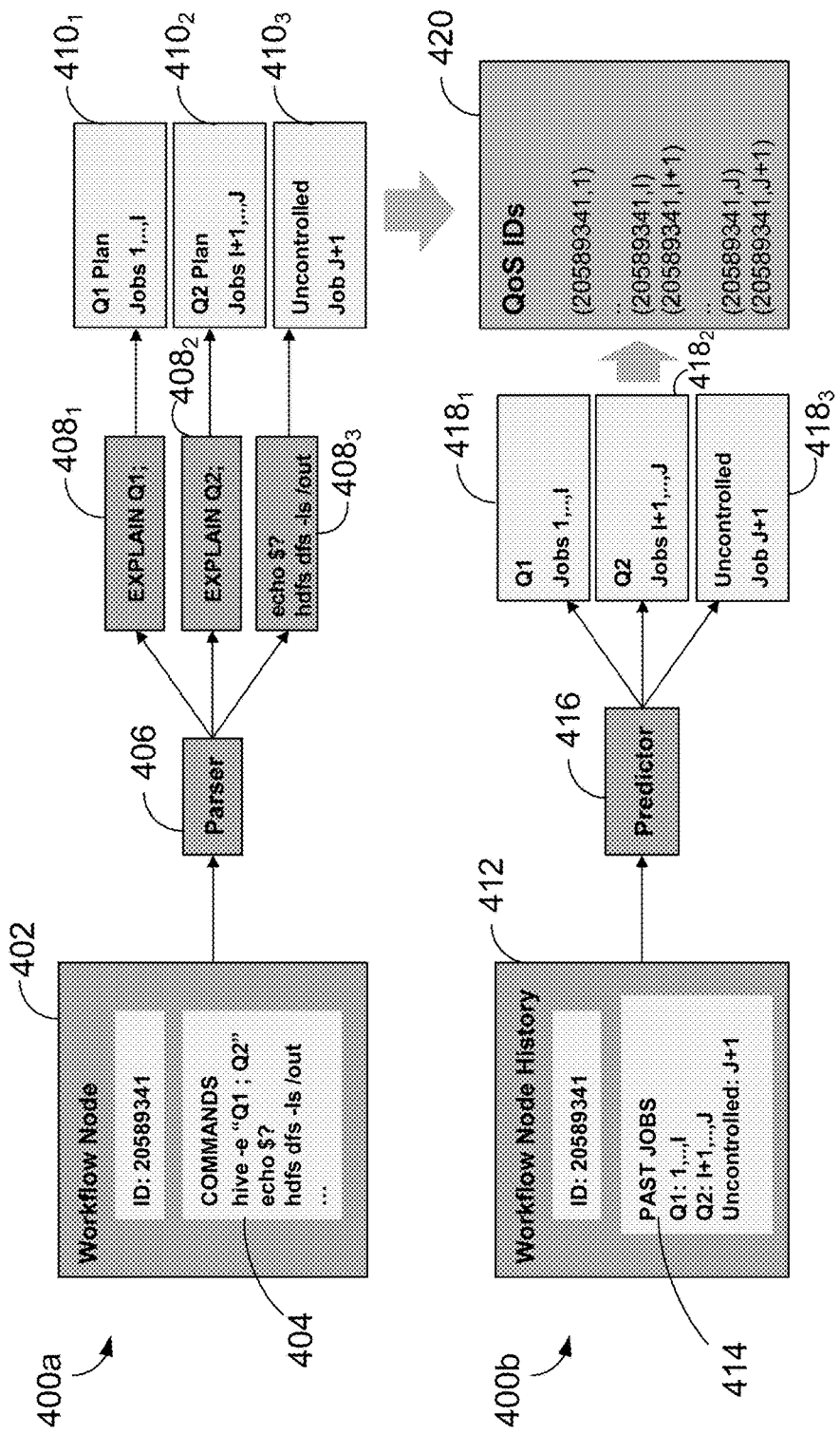
FIG. 4 illustrates example procedures implemented by the QoS identifier generation module of FIG. 3.

Referring now to FIG. 3 and FIG. 4, the SLA QoS identifier generation module 202 comprises a subtask discovery module 302, which may comprise one or more submodules 304a, 304b, 304c, . . . . The SLA QoS identifier generation module 202 further comprises an identifier generation module 306. The SLA QoS identifier generation module 202 receives from the workflow orchestrator 108 input data that is processed to generate a workflow graph with QoS identifiers. The input data may be pushed by the workflow orchestrator 108 or pulled by the SLA planning unit (reference 102 in FIG. 2). The input data indicates the number of workflow nodes, the dependencies between the workflow nodes, as well as metadata for each workflow node. The metadata includes, but is not limited to, an identifier (W) for each node, deadlines or earliest start times for the node, and commands that the node will execute on the gateway cluster (reference 110 in FIG. 1A). In some embodiments, the metadata comprises a resource requirement estimate for the node. The input data is then processed by the subtask discovery module 302 to identify the underlying subtasks associated with each workflow node.

The subtask discovery module 302 identifies underlying subtasks for a given workflow node using various techniques, which are each implemented by a corresponding submodule 304a, 304b, 304c, . . . . In one embodiment, a syntactic analysis module 304a is used to syntactically analyze the commands executed by the node to identify commands that impact operation of the underlying system (reference 106 in FIG. 1A). The syntactic analysis module 304a then sequentially assigns a number (N) to each command. This is illustrated in FIG. 4, which shows an example of a subtask discovery procedure 400a performed by the syntactic analysis module 304a. In the subtask discovery procedure 400a, the workflow node 402, whose identifier (W) is 20589341, executes a set of commands 404. The commands 404 are sent to a parser 406 (e.g. the query planner from Hive), which outputs a set of queries Q1, Q2 . . . , which are then encapsulated into suitable commands (e.g. the EXPLAIN command from Hive) $408_1$, $408_2$, $408_3$ to discover the corresponding underlying subtasks $410_1$, $410_2$, $410_3$. The underlying subtasks are then sequenced from 1 to J+1.

In another embodiment, in order to identify underlying subtasks for a given workflow node, a subtask prediction module 304b is used. The subtask prediction module 304b uses machine learning techniques to examine historical runs for the given workflow node. Based on prior runs, the subtask prediction module 304b predicts the subtasks that the node will execute and assigns a number (N) to each subtask. This is illustrated in FIG. 4, which shows an example of a subtask discovery procedure 400b performed by the subtask prediction module 304b. In the procedure 400b, the subtask prediction module 304b examines the workflow node history 412, which comprises a set of past jobs 414 executed by the workflow node 402 having identifier (W) 20589341. A predictor 416 is then used to predict the underlying subtasks $418_1$, $418_2$, $418_3$ that will be executed by the workflow node 402. The underlying subtasks $418_1$, $418_2$, $418_3$ discovered by procedure 400b (i.e. using the subtask prediction module 304b) are the same as the underlying subtasks $410_1$, $410_2$, $410_3$ discovered by the subtask discovery procedure 400a (i.e. using the syntactic analysis module 304a).

It should however be understood that various techniques other than syntactic analysis and prediction may be used to discover underlying subtasks for each workflow node (as illustrated by module 304c). For example, a user may provide his/her guess as to what the underlying subtasks will be and the SLA QoS identifier generation module 202 may receive this information as input. Still, regardless of the technique(s) implemented by the SLA QoS identifier generation module 202, it is desirable for the SLA QoS identifier generation module 202 to accurately predict the number and sequence of control system jobs that will be submitted to the underlying system (reference 106 in FIG. 1A) for each workflow orchestrator (or business tier) action. In this manner, it can be ensured that the QoS identifiers generated by the SLA QoS identifier generation module 202 match the QoS identifiers generated by the QoS identifier generation module (reference 212 in FIG. 2) provided in the job submission client (reference 210 in FIG. 2) and that submitted jobs will be able to use reserved resources.

As can be seen in FIG. 4, for any given workflow node, the underlying subtasks comprise controlled subtasks ($410_1$, $410_2$ or $418_1$, $418_2$), which are associated with dependent QoS-planned jobs. The underlying subtasks also comprise uncontrolled subtasks ($410_3$ or $418_3$), which are associated with workflow nodes that cannot be controlled (also referred to as opaque or obfuscated workflows). As will be discussed further below, the SLA planning unit (reference 102 in FIG. 2) models uncontrolled work by its duration only and assigns zero resources to uncontrolled work. In this manner, even though resources may be available for work dependent on the uncontrolled subtasks, the dependent work is required to wait for expiry of the duration before beginning.

Once the underlying subtasks have been discovered for a given workflow node, the identifier generation module 306 generates and assigns a unique QoS identifier to each subtask, including uncontrolled subtasks. In one embodiment, the pair (W, N) is used as the QoS identifier, which comprises the identifier (W) for each node and the number (N) assigned to each underlying subtask for the node. This is shown in FIG. 4, which illustrates that, for both subtask discovery procedures 400a and 400b, the QoS identifiers 420 are generated as a pair comprising the node identifier 20589341 and the subtask number (1, . . . , J+1). The identifier generation module 306 then outputs to the resource requirement assignment module 204 a graph of workflow nodes, including the generated QoS identifier for each workflow node. In particular, by generating dependencies between underlying subtasks identified by the subtask discovery module 302, the identifier generation module 306 expands on the workflow graph provided by the workflow orchestrator (reference 108 in FIG. 2).

Figure 5:
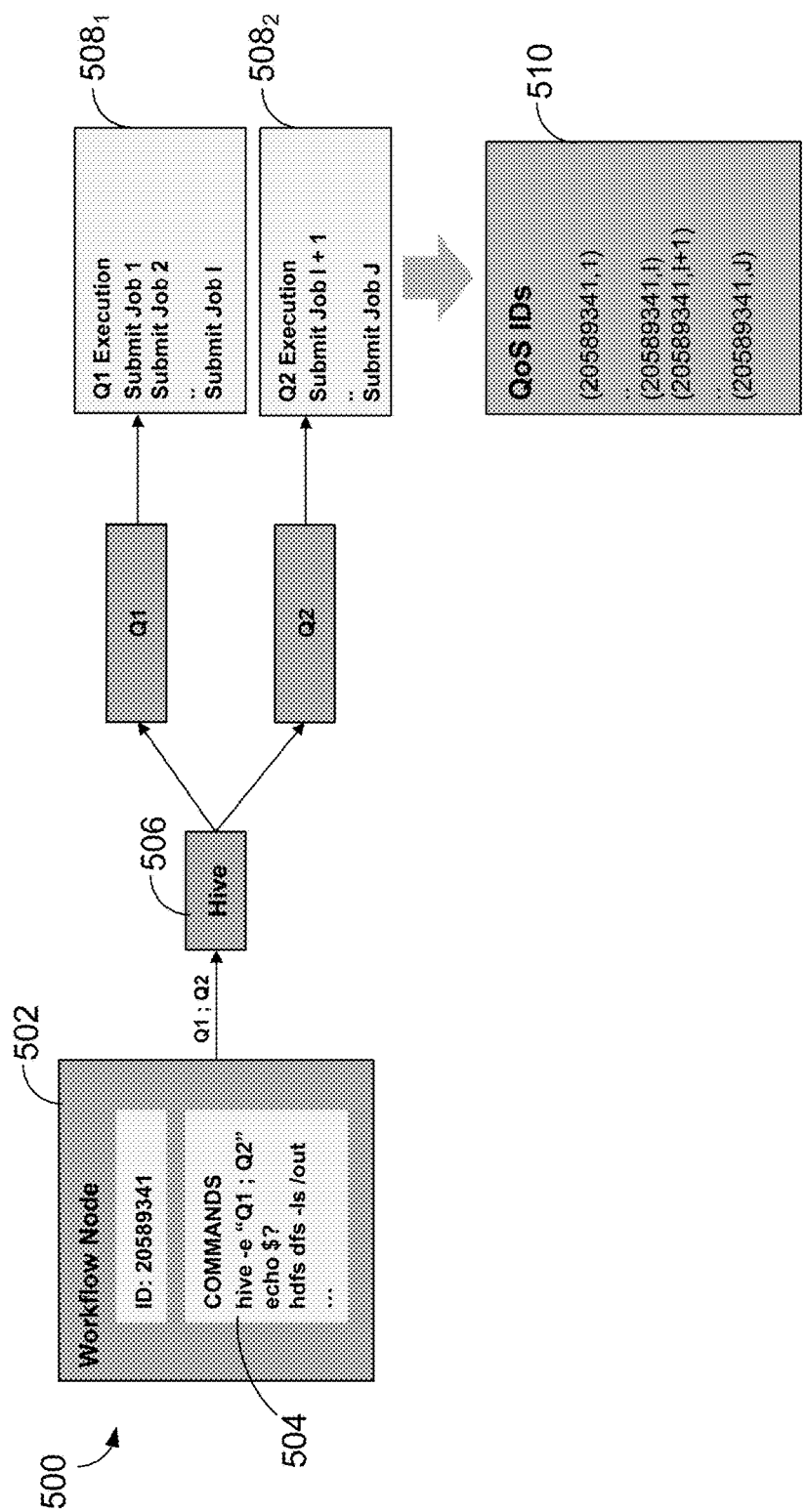
FIG. 5 illustrates an example procedure implemented by the QoS identifier generation module provided in the job submitter of FIG. 2.

As discussed above and illustrated in FIG. 5, the QoS identifier generation module (reference 212 in FIG. 2) provided in the job submission client (reference 210 in FIG. 2) implements a procedure 500 to replicate the QoS identifier generation procedure implemented by the SLA QoS identifier generation module (reference 202 in FIG. 2). The QoS identifier generation module 212 accordingly generates QoS identifiers for submitted jobs associated with a given workflow node 502 (having identifier (W) 20589341). In the example procedure 500, the commands 504 for node 502 are sent to a Hive query analyzer 506, which outputs queries Q1 and Q2, which are in turn respectively executed, resulting in two sets of jobs $508_1$ (numbered 1 to I), $508_2$ (numbered I+1 to J) being submitted for both queries. The QoS identifiers 510 are then generated by observing the order of the submitted jobs, determining the number (N, with N= 1, . . . , J in FIG. 5) of each submitted job, and using the pair (W, N) as the QoS identifier. It will be understood that the QoS identifier generation module 212 provided in the job submission client 210 provides QoS identifiers for controlled jobs only and does not take uncontrolled jobs into consideration. It will also be understood that the QoS identifier generation module 212 generates QoS identifiers 510, which are the same as the QoS identifiers (reference 420 in FIG. 4) generated by the SLA QoS identifier generation module 202 for controlled jobs (1, . . . , J). Once generated, the QoS identifiers 510 are attached to the workload submitted to the resource manager (reference 114 in FIG. 2) in order to indicate a desired (or requested) level of QoS and request a future resource allocation. In particular, the QoS identifiers 510 are sent to the resource manager 114 in order for the resource allocation to be leveraged by the submitted jobs.

Figure 6:
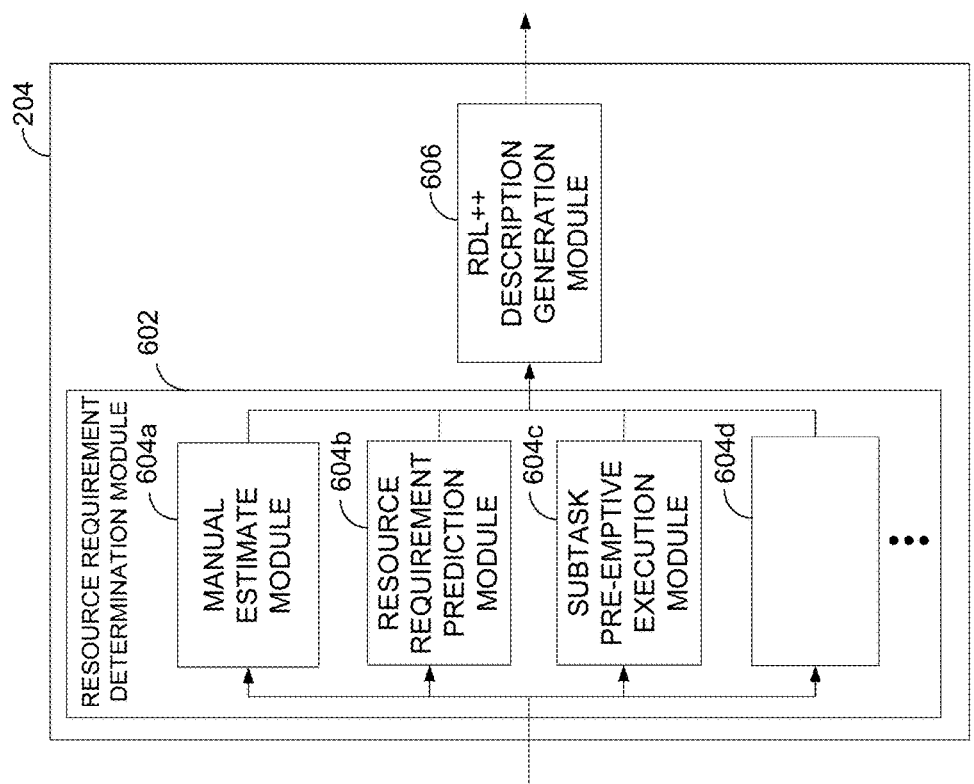
FIG. 6 is a block diagram of the resource requirement assignment module of FIG. 2.

Referring now to FIG. 6, the resource requirement assignment module 204 comprises a resource requirement determination module 602, which may comprise one or more submodules 604a, 604b, 604c, 604d, . . . . In particular, the resource requirement assignment module 204 determines the resource requirement for each subtask using various techniques, which are each implemented by a corresponding one of the submodules 604a, 604b, 604c, 604d, . . . . . The resource requirement assignment module 204 further comprises a reservation definition language (RDL++) description generation module 606. The resource requirement assignment module 204 receives from the SLA QoS identifier generation module (reference 202 in FIG. 2) the graph of workflow nodes with, for each workflow node, metadata comprising the QoS identifier generated for the node. As discussed above, in some embodiments, the metadata comprises an overall resource requirement estimate for the node, as provided by a user using suitable input means. In this case, the resource requirement determination module 602 uses a manual estimate module 604a to divide the overall resource requirement estimate uniformly between the underlying subtasks for the node.

In embodiments where no resource requirement estimate is provided, the resource requirement determination module 602 uses a resource requirement prediction module 604b to obtain the past execution history for the node and accordingly predict the resource requirement of each subtask. In other embodiments, the resource requirement determination module 602 uses a subtask pre-emptive execution module 604c to pre-emptively execute each subtask over a predetermined time period. Upon expiry of the predetermined time period, the subtask pre-emptive execution module 604c invokes a "kill" command to terminate the subtask. Upon terminating the subtask, the subtask pre-emptive execution module 604c obtains a sample of the current resource usage for the subtask and uses the resource usage sample to model the overall resource requirement for the subtask. For subtasks that were flagged as uncontrolled by the SLA QoS identifier generation module 202, the resource requirement determination module 602 sets the resource usage dimension of the resource requirement to zero and only assigns a duration. It should be understood that, in order to determine and assign a resource requirement to each subtask, techniques other than manual estimation of the resource requirement, prediction of the resource requirement, and pre-emptive execution of subtasks may be used (as illustrated by module 604d).

The RDL++ description generation module 606 then outputs a RDL++ description of the overall workflow. The RDL++ description is provided as a workflow graph that specifies the total resource requirement for each subtask (i.e. the total amount of system resources required to complete the subtask, typically expressed as megabytes of memory and CPU shares) as well as the duration of each subtask. The RDL++ description further specifies that uncontrolled subtasks only have durations, which must elapse before dependent tasks can be planned. In this manner and as discussed above, it is possible for some workflow nodes to require zero resources yet have a duration that should elapse before a dependent job can run.

Figure 7:
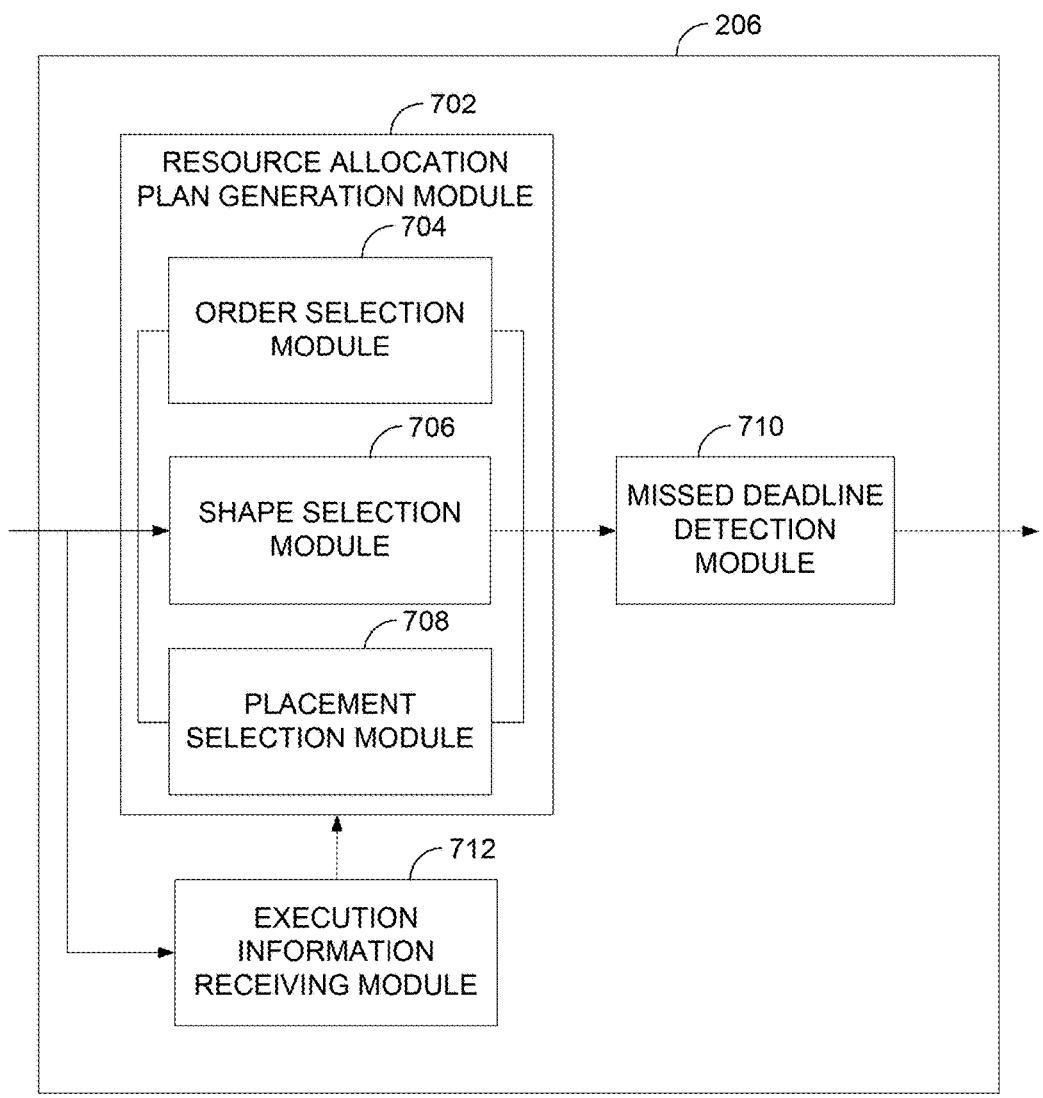
FIG. 7 is a block diagram of the planning framework module of FIG. 2.

Referring now to FIG. 7, the planning framework module 206 comprises a resource allocation plan generation module 702, which comprises an order selection module 704, a shape selection module 706, and a placement selection module 708. The planning framework module 206 further comprises a missed deadline detection module 710 and an execution information receiving module 712. The planning framework module 206 receives from the resource requirement assignment module (reference 204 in FIG. 2) a graph of workflow nodes (e.g. the RDL++ description) with metadata for each workflow node. As discussed above, the metadata comprises the QoS identifier generated by the SLA QoS identifier generation module (reference 202 in FIG. 2) for each workflow node, the resource requirement assigned to the node by the resource requirement assignment module 204, and a capacity of the underlying system (as provided, for example, by a user using suitable input means). In some embodiments, the metadata comprises the deadline or minimum start time for each workflow node (as provided, for example, by a user using suitable input means).

The planning framework module 206 then generates, for each workflow node in the RDL++ graph, a resource allocation plan for each subtask of the node using the resource allocation plan generation module 702. The resource allocation plan specifies the manner in which the resources required by the subtask are distributed over time, thereby indicating the level of QoS for the corresponding workflow node. In particular, the resource allocation plan generation module 702 determines the distribution over time of the resources required by each subtask by selecting an order in which to assign resource allocations to each subtask, a resource allocation over time for each subtask, and/or a start time for each subtask. For this purpose, the order selection module 704 chooses the order in which to assign resource allocations to each subtask. The shape selection module 706 chooses a shape (i.e. the resource allocation over time) for each subtask. The placement selection module 708 chooses a placement (i.e. the start time) for each subtask.

In one embodiment, each one of the order selection module 704, the shape selection module 706, and the placement selection module 708 makes the respective choice of order, shape, and placement heuristically. In another embodiment, each one of the order selection module 704, the shape selection module 706, and the placement selection module 708 makes the respective choice of order, shape, and placement in order to optimize an objective function. In yet another embodiment, each one of the order selection module 704, the shape selection module 706, and the placement selection module 708 makes the respective choice of order, shape, and placement in a random manner. In yet another embodiment, the jobs that are on the critical path of workflows with early deadlines are ordered, shaped, and placed, before less-critical jobs (e.g. jobs that are part of workflows with less-pressing deadlines). It should also be understood that the order selection module 704, the shape selection module 706, and the placement selection module 708 may operate in a different sequence, e.g. with shape selection happening before order selection. Moreover, the different modules may operate in an interleaved or iterative manner.

As discussed above, in some embodiments, the deadline or minimum start time for each workflow node is provided as an input to the planning framework module 206. In this case, for each workflow node, the missed deadline detection module 710 determines whether any subtask has violated its deadline or minimum start time. The missed deadline detection module 710 then returns a list of subtasks whose deadline is not met. The missed deadline detection module 710 further outputs the resource allocation plan and the quality of service identifier associated with each subtask to the resource manager (reference 114 in FIG. 2). The resource manager 114 waits for jobs to be submitted with the same QoS identifiers as the QoS identifiers associated with the workflow nodes (as per the resource allocation plan) and enforces the level of QoS specified in the resource allocation plan for the workflow nodes. In this manner, it is possible to ensure that jobs can be completed by the specified deadlines and SLAs met as per user requirements.

It should be understood that the SLA planning unit 102 may manage multiple resource allocation plans within a single workflow orchestrator 108 or underlying system instance (for multi-tenancy support for example). It should also be understood that, in addition to providing the resource allocation plan for each subtask to the underlying system 106, the SLA planning unit 102 may also provide the resource allocation plan to the workflow orchestrator 108. In this case, the SLA planning unit 102 may push the resource allocation plan to the workflow orchestrator 108. The resource allocation plan may alternatively be pulled by the workflow orchestrator 108. For each workflow node, the workflow orchestrator 108 may then use the resource allocation plan to track the planned start times of each subtask, or wait to submit workflows until their planned start times.

Figure 8:
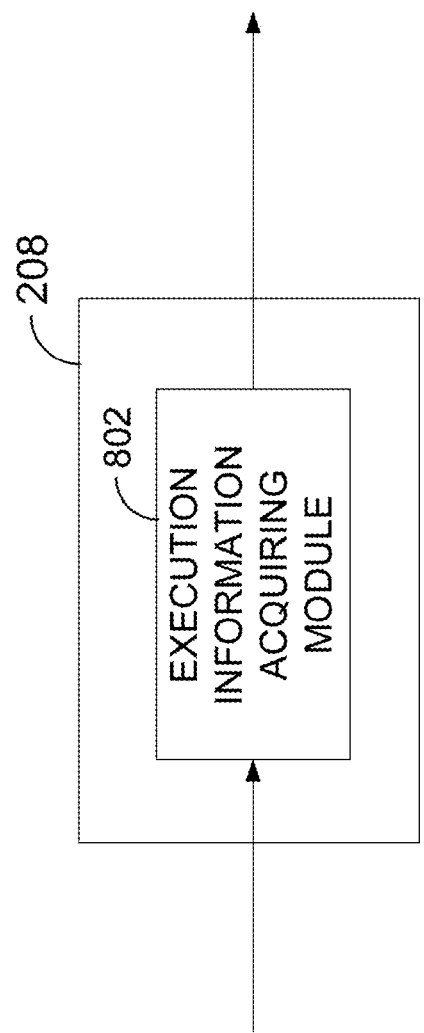
FIG. 8 is a block diagram of the execution monitoring module of FIG. 2.

Referring now to FIG. 8 in addition to FIG. 7, the execution monitoring module 208 is used to monitor the actual workload progress at both the workflow orchestration and underlying system levels. For this purpose, the execution monitoring module 208 comprises an execution information acquiring module 802 that obtains execution status information from the workflow orchestrator (reference 108 in FIG. 1A) and the resource manager (reference 114 in FIG. 1A). In one embodiment, the execution information acquiring module 802 retrieves (e.g. pulls) the execution information from the workflow orchestrator 108 and the resource manager 114. In another embodiment, the workflow orchestrator 108 and the resource manager 114 send (e.g. push) the execution information to the execution information acquiring module 802. The execution status information obtained from the workflow orchestrator 108 comprises information about top-level workflow node executions including, but not limited to, start time, finish time, normal termination, and abnormal termination. The execution status information obtained from the resource manager 114 comprises information about underlying system jobs including, but not limited to, start time, finish time, percentage of completion, and actual resource requirement.

Once the execution monitoring module 208 determines the actual workload progress, the execution information acquiring module 802 sends the execution information to the planning framework module 206. The execution information is then received at the execution information receiving module 712 of the planning framework module 206 and sent to the resource allocation plan generation module 702 so that one or more existing resource allocation plans can be adjusted accordingly. Adjustment may be required in cases where the original resource requirement was incorrectly determined by the resource requirement assignment module (reference 204 in FIG. 2). For example, incorrect determination of the original resource requirement may occur as a result of incorrect prediction of the subtask requirement. Inaccurate user input (e.g. an incorrect resource requirement estimate was provided) can also result in improper determination of the resource requirement.

When it is determined that adjustment is needed, the resource allocation plan generation module 702 adjusts the resource allocation plan for one or more previously-planned jobs based on actual resource requirements. The adjustment may comprise re-planning all subtasks or re-planning individual subtasks to stay on schedule locally. For example, the adjustment may comprise raising downstream job allocations. In this manner, using the execution monitoring module 208, top-level SLAs can be met even in cases where the original resource requirement was incorrectly planned.

In one embodiment, upon determining that adjustment of the resource allocation plan(s) is needed, the resource allocation plan generation module 702 assesses whether enough capacity is present in the existing resource allocation plan(s) to allow adjustment thereof. If this is not the case, the resource allocation plan generation module 702 outputs information indicating that no adjustment is possible. This information may be output to a user using suitable output means. For example, adjustment of the resource allocation plan(s) may be impossible if the resource allocation plan generation module 702 determines that some subtasks require more resources than originally planned. In another embodiment, the priority of different workflows is taken into consideration and resource allocation plan(s) adjusted so that higher-capacity tasks may complete, even if the entire capacity has been spent. In particular, even if no spare capacity exists in the resource allocation plan(s), in this embodiment the resource allocation plan generation module 702 allocates resources from one subtask to another higher-capacity subtask. In yet another embodiment, the resource allocation plan generation module 702 adjusts the existing resource allocation plan(s) so that, although a given SLA is missed, a greater number of SLAs might be met.

Figure 9:
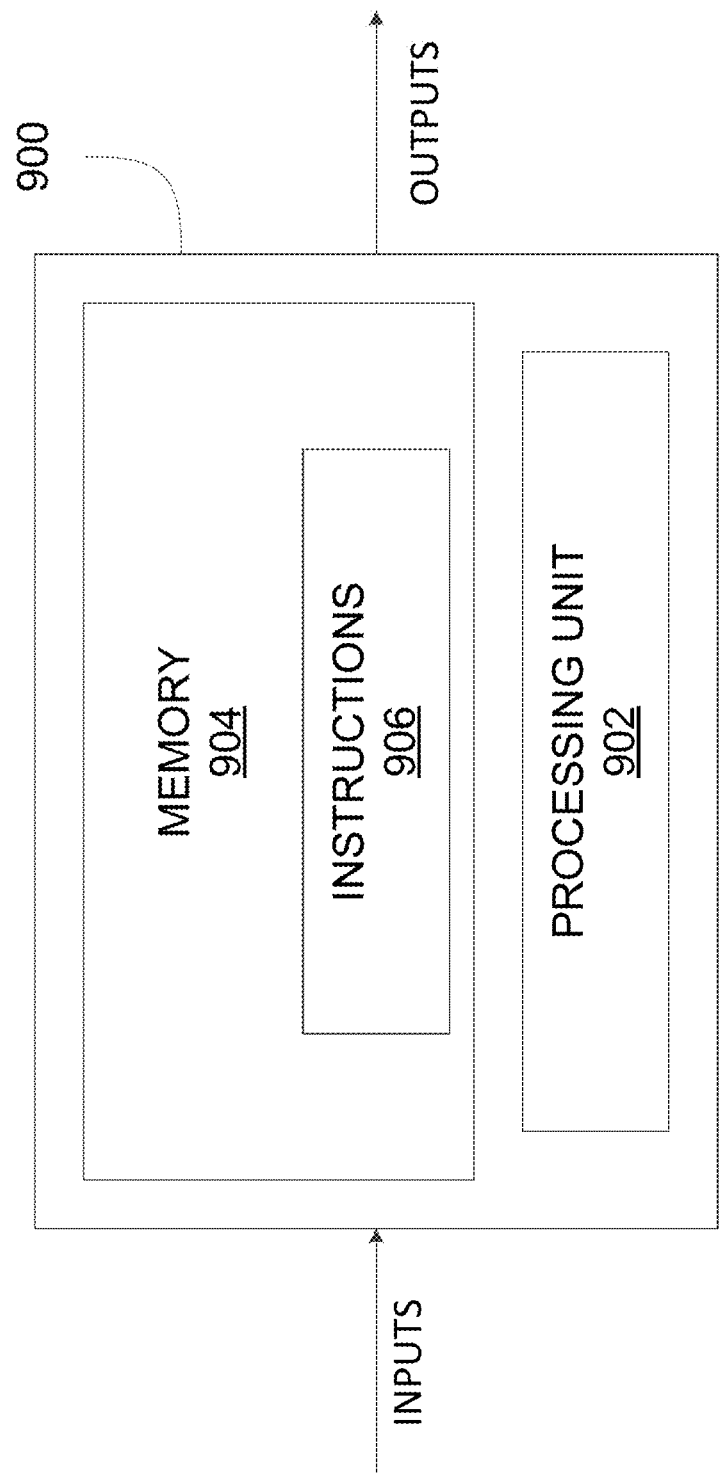
FIG. 9 is a block diagram of an example computing device for implementing the SLA planning unit of FIG. 2.

FIG. 9 is an example embodiment of a computing device 900 for implementing the SLA planning unit (reference 102 in FIG. 1A). The computing device 900 comprises a processing unit 902 and a memory 904 which has stored therein computer-executable instructions 906. The processing unit 902 may comprise any suitable devices configured to cause a series of steps to be performed such that instructions 906, when executed by the computing device 900 or other programmable apparatus, may cause the functions/acts/steps specified in the methods described herein to be executed. The processing unit 902 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 904 may comprise any suitable known or other machine-readable storage medium. The memory 904 may comprise non-transitory computer readable storage medium, for example, but not limited to, an electronic, magnetic, optical, electromagnetic, infrared, or semiconductor system, apparatus, or device, or any suitable combination of the foregoing. The memory 904 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 904 may comprise any storage means (e.g., devices) suitable for retrievably storing machine-readable instructions 906 executable by processing unit 902.

Referring now to FIG. 10, an example method 1000 for ensuring quality of service in a compute workflow will now be described. The method 1000 is implemented by the SLA planning unit (reference 102 in FIG. 1A) prior to jobs being submitted to the underlying system (reference 106 in FIG. 1A). The method 1000 comprises at step 1002 identifying, for each workflow node, underlying subtasks and dependencies between the underlying subtasks. A unique quality of service (QoS) identifier is then assigned at step 1004 to each subtask. A total resource requirement is further determined for each subtask at step 1006. A reservation definition language (RDL++) description of the entire workflow is output at step 1008 and a resource allocation plan generated for each node in the RDL++ description at step 1010. The next step 1012 is to monitor the actual progress of workload at the workflow orchestration and underlying system levels. At step 1014, one or more existing resource allocations are then updated based on the actual resource requirement, as needed. The resource allocation plans and the corresponding QoS identifiers are then submitted to the underlying system resource manager for enforcement (step 1016). In particular, whenever a job having the QoS ID associated therewith arrives at the underlying system, the underlying system resource manager allocates resources according to (e.g. as specified by) the corresponding resource allocation plan.

Figure 11:
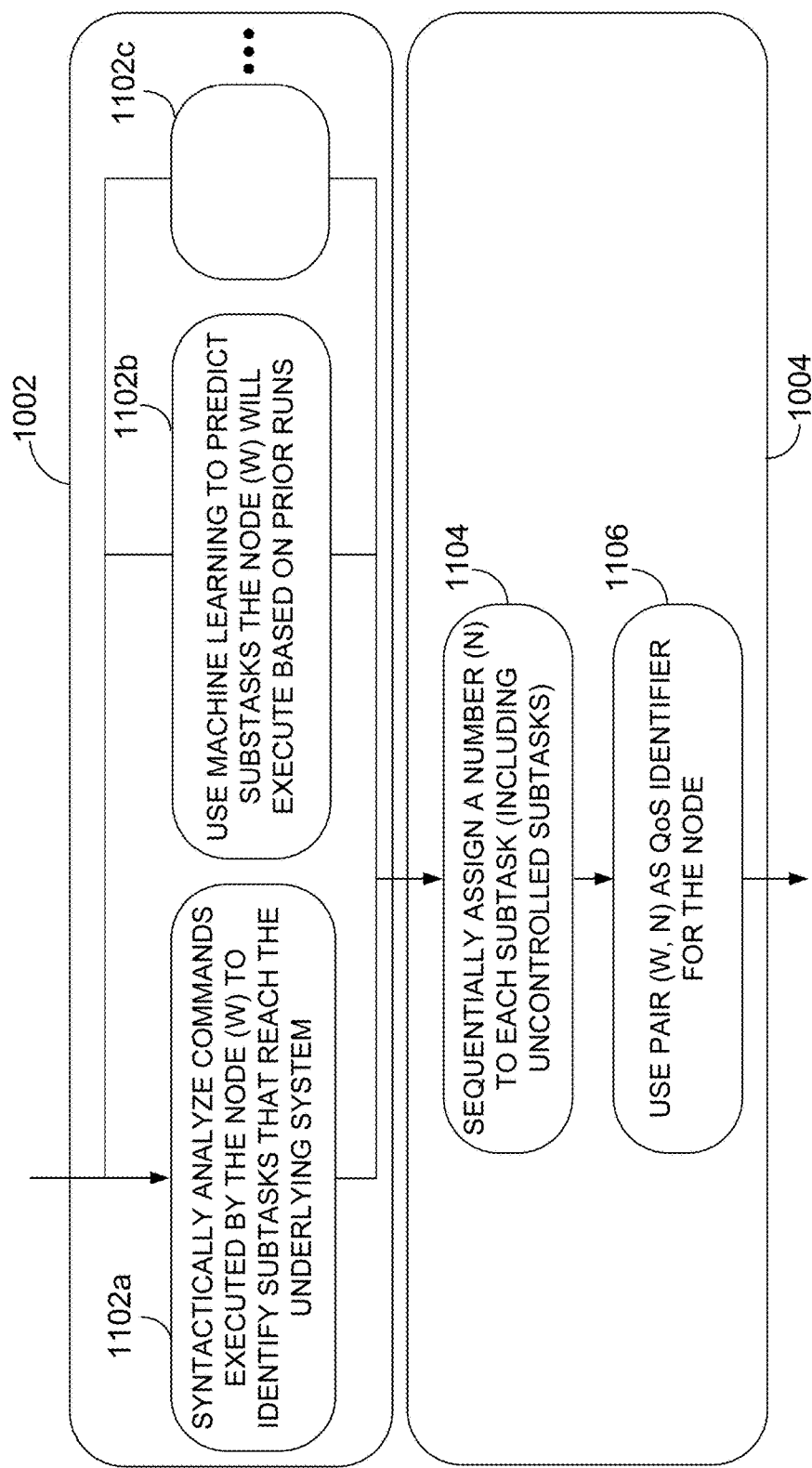
FIG. 11 illustrates a flowchart of the steps of FIG. 10 of identifying underlying subtasks for each workflow node and assigning a QoS identifier to each subtask.

Referring now to FIG. 11, in one embodiment, the step 1002 of identifying underlying subtasks for each workflow node comprises syntactically analyzing commands executed by the node (W) to identify the subtasks that impact operation of the underlying system (step 1102a). In another embodiment, the step 1002 of identifying underlying subtasks for each workflow node comprises using machine learning techniques to predict the subtasks that the node (W) will execute based on prior runs (step 1102b). As discussed above, underlying subtasks may be discovered using a number of techniques other than syntactical analysis or prediction (as illustrated by step 1102c). For example, although not illustrated in FIG. 11, the step 1002 may comprise receiving a user-provided prediction as to what the underlying subtasks will be. The step 1004 of assigning a QoS identifier to each subtask then comprises sequentially assigning (step 1104) a number (N) to each previously-identified subtask (including uncontrolled subtasks). The pair (W, N) is then used as the QoS identifier for the node at hand (step 1106).

Figure 12:
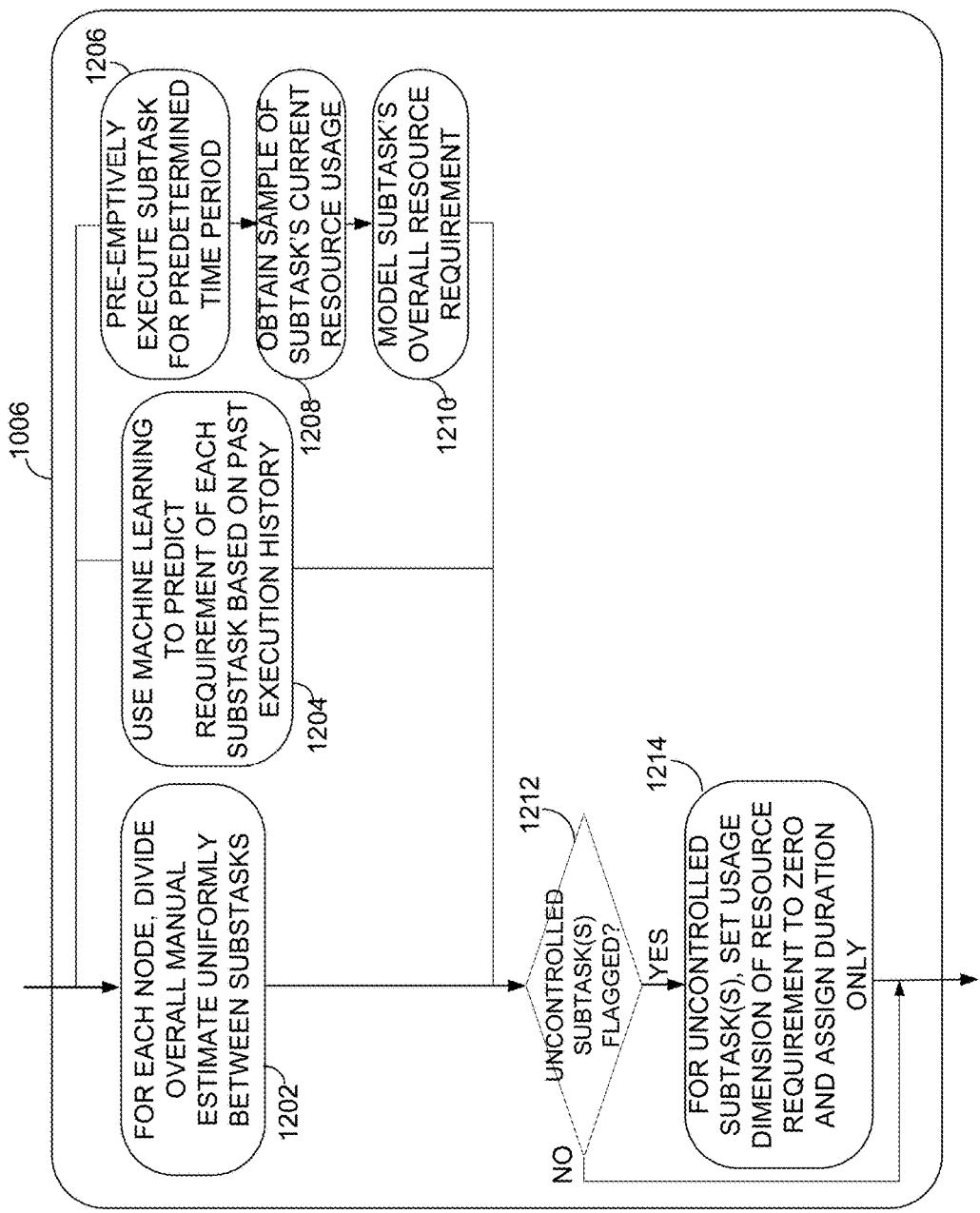
FIG. 12 illustrates a flowchart of the step of FIG. 10 of determining a total resource requirement for each subtask.

Referring to FIG. 12, in one embodiment, the step 1006 comprises dividing at step 1202 an overall manual estimate uniformly between the subtasks of each node, e.g. a manual estimate received through user input. In another embodiment, machine learning is used at step 1204 to predict the resource requirement of each subtask based on past execution history. In yet another embodiment, each subtask is pre-emptively executed for a predetermined time period (step 1206). The subtask is then terminated and a sample of the current resource usage of the subtask is obtained at step 1208. The current resource usage sample is then used at step 1210 to model the overall resource requirement for the subtask. The next step 1212 is then to assess whether any uncontrolled subtasks have been flagged during the QoS identifier generation process (steps 1002 and 1004 of FIG. 10). If this is not the case, the method 1000 proceeds to the next step 1008. Otherwise, the next step 12142 is to set the usage dimension of the resource requirement for the uncontrolled subtask(s) to zero and only assign duration to the uncontrolled subtask(s).

Figure 13:
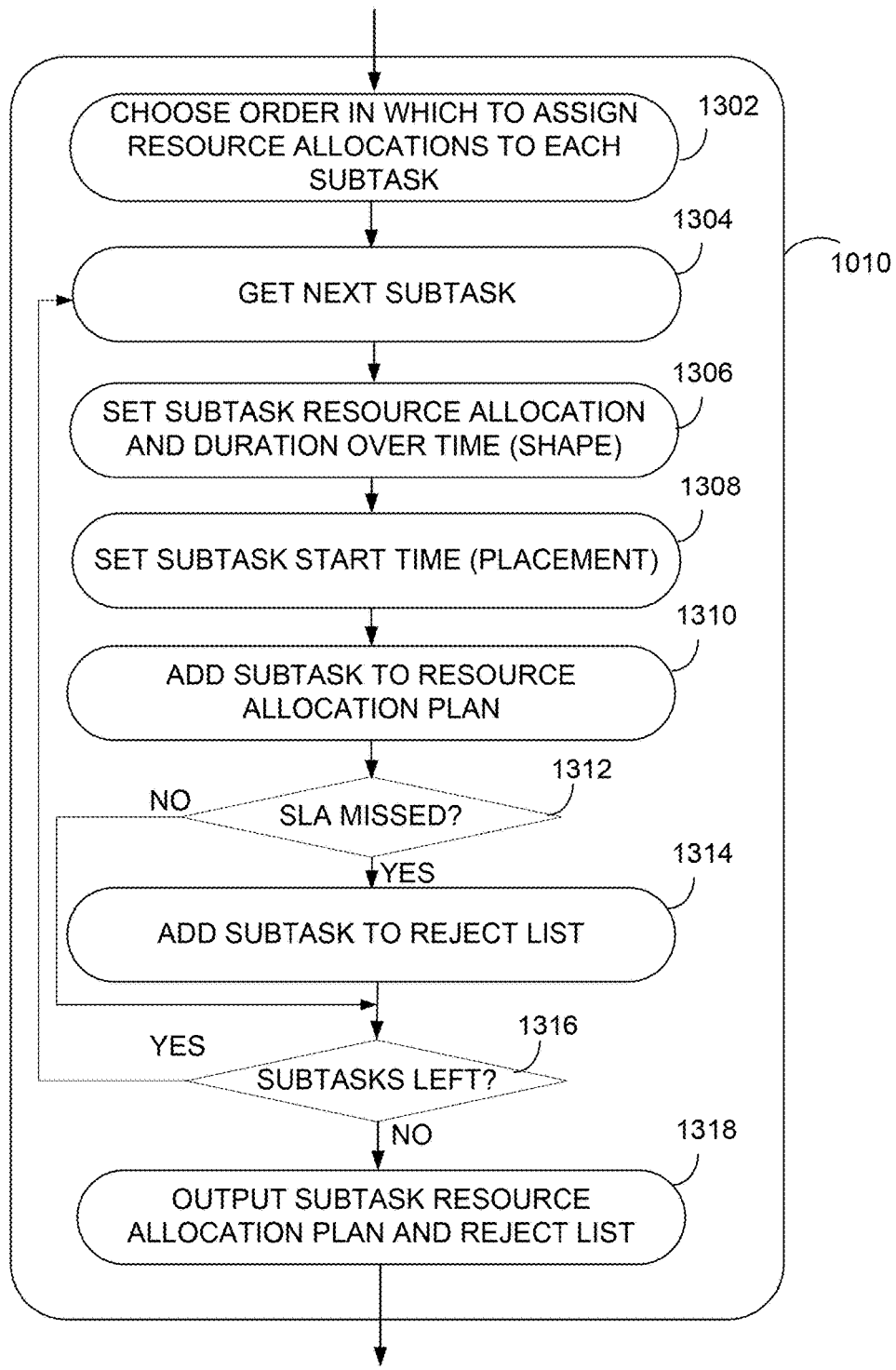
FIG. 13 illustrates a flowchart of the step of FIG. 10 of generating a resource allocation plan for each node.

Referring now to FIG. 13, the step 1010 of generating a resource allocation plan comprises choosing at step 1302 an order in which to assign resource allocations to each subtask. Once the order has been chosen, the next step 1304 is to get the next subtask. The resource allocation and duration over time (i.e. the shape) for the current subtask is then set at step 1306. The subtask start time (i.e. the placement) is then set at step 1308 and the subtask is added to the resource allocation plan at step 1310. The next step 1312 is then to assess whether a deadline has been missed for the current subtask. If this is the case, the subtask is added to a reject list at step 1314. Otherwise, the next step 1316 is to determine whether there remains subtasks to which a resource allocation is to be assigned. If this is the case, the method returns to step 1304 and gets the next subtask. Otherwise, the resource allocation plan and reject list are output at step 1318.

As discussed above, the choice of order, shape, and placement can be made heuristically, in order to optimize an objective function, or in a random manner. Critical jobs can also be ordered, shaped, and placed, before less-critical jobs. It should also be understood that the steps 1302, 1306, and 1308 can be performed in a different sequence or in an interleaved or iterative manner.

Figure 14:
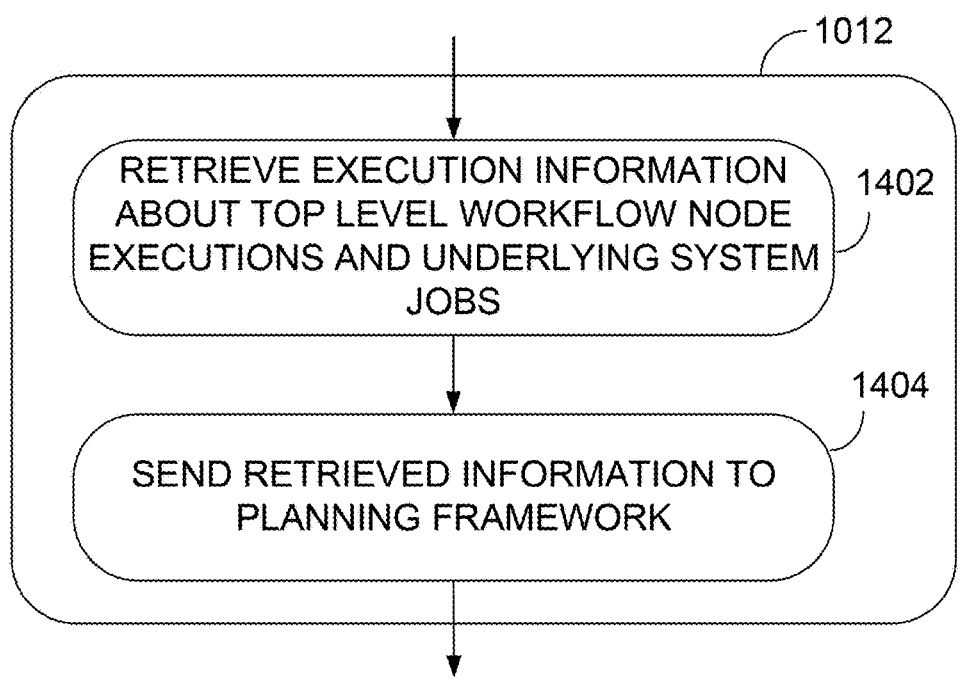
FIG. 14 illustrates a flowchart of the step of FIG. 10 of monitoring the actual progress of workload at the workflow orchestration and control system levels.
Figure 15:
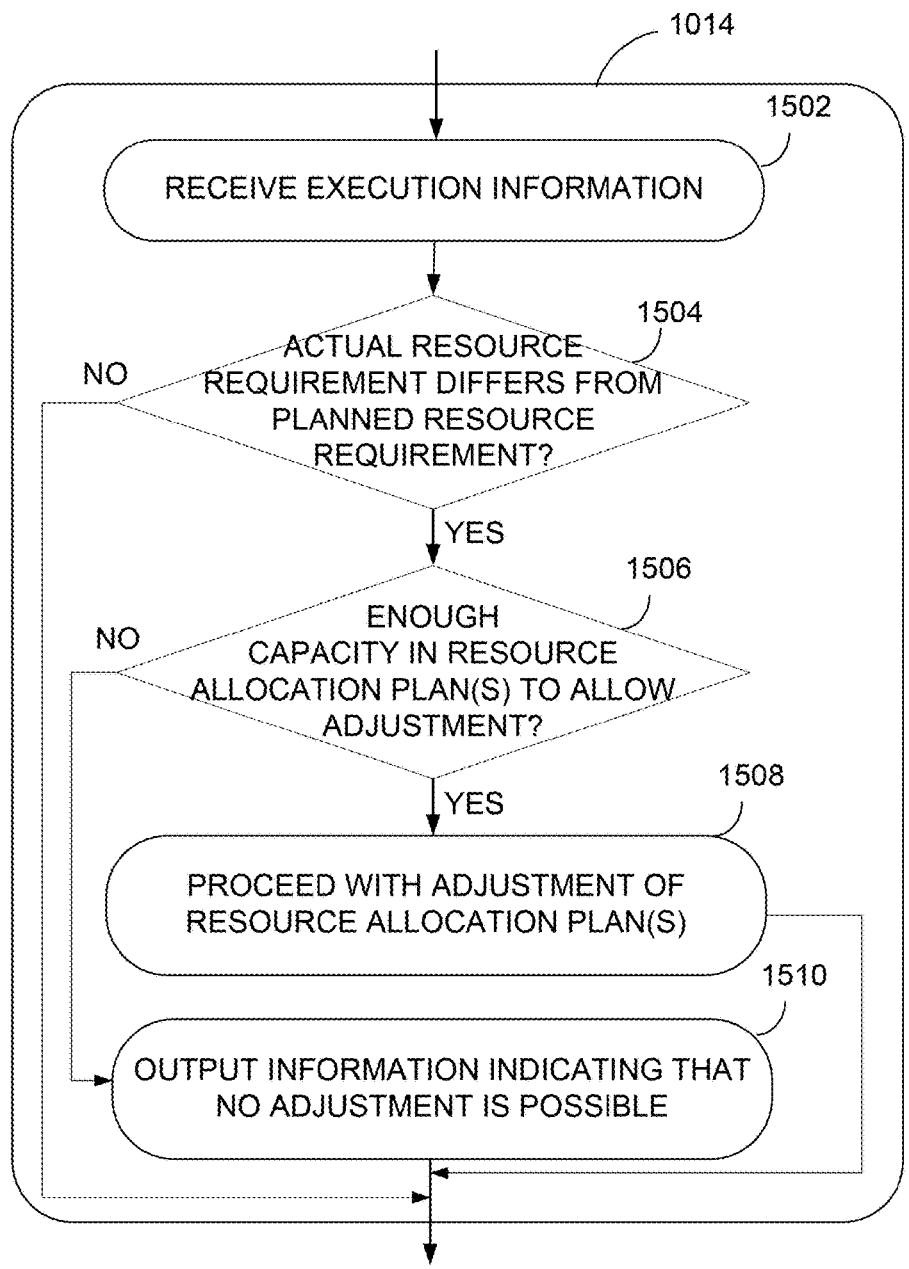
FIG. 15 illustrates a flowchart of the step of FIG. 10 of updating existing resource allocation plan(s) based on actual resource requirement, as needed.

Referring to FIG. 14, the step 1012 of monitoring the actual progress of the workload at the workflow orchestration and underlying system levels comprises retrieving at step 1402 execution information about top level workflow node executions and underlying system jobs. The retrieved information is then sent to the planning framework at step 1404 for causing adjustment of one or more existing resource allocation plans. As illustrated in FIG. 15, the step 1014 of updating one or more existing resource allocation plans based on the actual resource requirement comprises receiving the execution information at step 1502 and assessing, based on the received execution information, whether the actual resource requirement differs from the planned resource requirement (step 1504). If this is not the case, the method flows to the next step, i.e. step 1016 of FIG. 10. Otherwise, in one embodiment, the next step 1506 is to assess whether there is enough capacity in the existing resource allocation plan(s) to allow adjustment. If this is the case, the next step 1508 is to proceed with adjustment of the existing resource allocation plan(s) based on the actual workload execution information and on the actual resource requirement. Otherwise, information indicating that no adjustment is possible is output (e.g. to the user, step 1510) and the method then flows to step 1016. For example, even if no spare capacity exists in the resource allocation plan(s), resources from one subtask may be allocated to a higher-capacity subtask. Alternatively, the existing resource allocation plan(s) may be adjusted so that, although a given SLA is missed, a greater number of SLAs is met.

Figure 16:
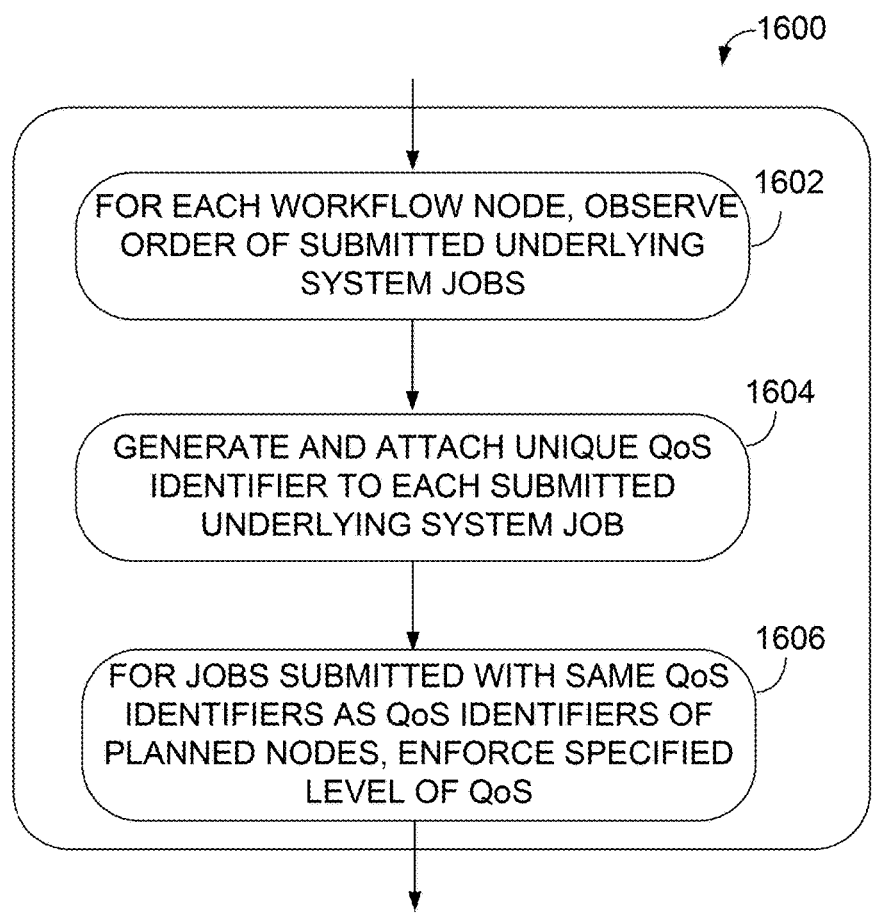
FIG. 16 illustrates a flowchart of an example procedure implemented at the control system of FIG. 1A to generate QoS identifiers and enforce QoS, in accordance with one embodiment.

Referring now to FIG. 16, a QoS identifier generation procedure 1600, which replicates step 1004 of FIG. 10, is implemented at the underlying system (reference 106 in FIG. 1A). The procedure 1600 comprises at step 1602, for each workflow node, observing the order of submitted underlying system jobs. A unique QoS identifier is then generated and attached to each submitted job at step 1604. The next step 1606 is then to enforce the level of QoS specified in (i.e. allocate resource according to) the resource allocation plan for jobs submitted with the same QoS identifiers as the QoS identifiers associated with workflow nodes for which a resource allocation plan was generated. As a result, it is possible to ensure that submitted jobs, which are presented at the underlying system level, attain a particular level of service, thereby meeting the business workflow SLA.

The above description is meant to be for purposes of example only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified.

Although illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. Based on such understandings, the technical solution of the present invention may be embodied in the form of a software product. The software product may be stored in a non-volatile or non-transitory storage medium, which can be a read-only memory (ROM), a magnetic disk, an optical disc, a flash drive, or any other suitable storage media or device.

Each computer program described herein may be implemented in a high level procedural or object oriented programming or scripting language, or a combination thereof, to communicate with a computer system. Alternatively, the programs may be implemented in assembly or machine language. The language may be a compiled or interpreted language. The software product includes a number of instructions that enable a computer device (personal computer, server, or network device) to execute the methods provided in the embodiments of the present invention. Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments. The structure illustrated is thus provided for efficiency of teaching the present embodiment. The present disclosure may be embodied in other specific forms without departing from the subject matter of the claims.

Also, one skilled in the relevant arts will appreciate that although the systems, methods and computer readable mediums disclosed and shown herein may comprise a specific number of elements/components, the systems, methods and computer readable mediums may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

What is claimed is:

1. A method for ensuring quality of service in a compute workflow, the method comprising, at a planning unit:
assigning a first quality of service identifier to each of one or more subtasks associated with each node of the compute workflow, the first quality of service identifier indicative of a level of quality of service assigned to each node;
assigning a planned resource requirement to each of the one or more subtasks, the planned resource requirement indicative of a total amount of system resources required to complete each of the one or more subtasks;
generating a resource allocation plan for each of the one or more subtasks having the first quality of service identifier and the planned resource requirement assigned thereto, the resource allocation plan indicative of a distribution of the system resources over time in at least one resource manager; and
outputting the resource allocation plan and the first quality of service identifier to the at least one resource manager for enforcement of the level of quality of service on one or more jobs submitted for each node through at least one workflow orchestrator external to the at least one resource manager, each of the one or more jobs comprising the one or more subtasks.

2. The method of claim 1, further comprising, at the planning unit:
retrieving, from the at least one workflow orchestrator and from the at least one resource manager, execution information indicative of a current progress of the one or more subtasks and of the one or more jobs;
determining from the execution information an actual resource requirement for each of the one or more subtasks;
comparing the actual resource requirement to the planned resource requirement; and
dynamically adjusting the resource allocation plan of at least one of the one or more subtasks if the actual resource requirement differs from the planned resource requirement.

3. The method of claim 1, further comprising, at the planning unit, receiving, from the at least one workflow orchestrator, input data comprising a number of nodes in the compute workflow, dependencies between nodes, and metadata for each node, the metadata comprising a node identifier, one or more deadlines for each node, one or more commands executed by each node, and a resource requirement estimate for each node, wherein the one or more subtasks are identified based on the input data.

4. The method of claim 3, further comprising, at the planning unit:
performing a syntactical analysis of the one or more commands to identify ones of the one or more commands that impact operation of the at least one resource manager; and
sequentially assigning a number to each of the identified commands, the first quality of service identifier comprising the node identifier and the assigned number.

5. The method of claim 3, further comprising, at the planning unit:
predicting the one or more subtasks based on a past execution history for each node; and
sequentially assigning a number to each of the predicted one or more subtasks, the first quality of service identifier comprising the node identifier and the assigned number.

6. The method of claim 3, wherein assigning the planned resource requirement comprises, at the planning unit, dividing the resource requirement estimate uniformly between the one or more subtasks.

7. The method of claim 1, wherein assigning the planned resource requirement comprises, at the planning unit, predicting the planned resource requirement for each of the one or more subtasks based on a past execution history for each node.

8. The method of claim 1, wherein assigning the planned resource requirement comprises, at the planning unit:
executing each of the one or more subtasks for a predetermined period of time;
terminating each of the one or more subtasks upon expiry of the predetermined period of time;
obtaining a current resource usage sample for each of the one or more subtasks upon termination of each of the one or more subtasks; and
modelling the planned resource requirement based on the current resource usage sample.

9. The method of claim 1, further comprising, at the planning unit, identifying uncontrolled ones of the one or more subtasks, each uncontrolled subtask associated with an unknown workflow, and wherein assigning the planned resource requirement comprises, at the planning unit, setting the total amount of system resources required to complete each uncontrolled subtask to zero and modeling the uncontrolled subtask as having a non-zero duration.

10. The method of claim 1, wherein generating the resource allocation plan comprises, at the planning unit, choosing an order in which to assign resource allocations to each of the one or more subtasks, choosing a resource allocation over time for each of the one or more subtasks, and choosing a start time for each of the one or more subtasks.

11. The method of claim 3, further comprising, at the planning unit, identifying ones of the one or more subtasks having violated the one or more deadlines, adding the identified subtasks to a subtask reject list, and outputting the subtask reject list.

12. The method of claim 1, further comprising:
at a job submitter, assigning to each of the one or more jobs a second quality of service identifier indicative of a requested level of quality of service for each node; and
at the at least one resource manager, receiving the first quality of service identifier, the second quality of service identifier, and the resource allocation plan and allocating the system resources in accordance with the resource allocation plan for ones of the one or more jobs for which the second quality of service identifier corresponds to the first quality of service identifier.

13. The method of claim 12, wherein assigning the second quality of service identifier comprises observing an order of the one or more jobs and assigning a number to each of the one or more jobs in accordance with the order, the second quality of service identifier comprising the assigned number and a node identifier.

14. A system for ensuring quality of service in a compute workflow, the system comprising:
at least one processing unit; and
a non-transitory memory communicatively coupled to the at least one processing unit and comprising computer-readable program instructions executable by the at least one processing unit for:
assigning a first quality of service identifier to each of one or more subtasks associated with each node of the compute workflow, the first quality of service identifier indicative of a level of quality of service assigned to each node;

assigning a planned resource requirement to each of the one or more subtasks, the planned resource requirement indicative of a total amount of system resources required to complete each of the one or more subtasks;

generating a resource allocation plan for each of the one or more subtasks having the first quality of service identifier and the planned resource requirement assigned thereto, the resource allocation plan indicative of a distribution of the system resources over time in at least one resource manager; and outputting the resource allocation plan and the first quality of service identifier to the at least one resource manager for enforcement of the level of quality of service on one or more jobs submitted for each node through at least one workflow orchestrator external to the at least one resource manager, each of the one or more jobs comprising the one or more subtasks.

15. The system of claim 14, wherein the computer-readable program instructions are executable by the at least one processing unit for:

retrieving, from the at least one workflow orchestrator and from the at least one resource manager, execution information indicative of a current progress of the one or more subtasks and of the one or more jobs;

determining from the execution information an actual resource requirement for each of the one or more subtasks;

comparing the actual resource requirement to the planned resource requirement; and dynamically adjusting the resource allocation plan of at least one of the one or more subtasks if the actual resource requirement differs from the planned resource requirement.

16. The system of claim 14, wherein the computer-readable program instructions are executable by the at least one processing unit for:

receiving from the at least one workflow orchestrator a node identifier for each node and one or more commands executed by each node;

performing a syntactical analysis of the one or more commands to identify ones of the one or more commands that impact operation of the at least one resource manager; and sequentially assigning a number to each of the identified commands, the first quality of service identifier comprising the node identifier and the assigned number.

17. The system of claim 14, wherein the computer-readable program instructions are executable by the at least one processing unit for:

receiving from the at least one workflow orchestrator a node identifier and a past execution history for each node;

predicting the one or more subtasks based on the past execution history; and sequentially assigning a number to each of the predicted one or more subtasks, the first quality of service identifier comprising the node identifier and the assigned number.

18. The system of claim 14, wherein the computer-readable program instructions are executable by the at least one processing unit for identifying uncontrolled ones of the one or more subtasks, each uncontrolled subtask associated with an unknown workflow, and for assigning the planned resource requirement comprising setting the total amount of system resources required to complete each uncontrolled subtask to zero and modeling the uncontrolled subtask as having a non-zero duration.

19. The system of claim 14, wherein the computer-readable program instructions are executable by the at least one processing unit for generating the resource allocation plan comprising choosing an order in which to assign resource allocations to each of the one or more subtasks, choosing a resource allocation over time for each of the one or more subtasks, and choosing a start time for each of the one or more subtasks.

20. The system of claim 14, wherein the computer-readable program instructions are executable by the at least one processing unit for:

assigning to each of the one or more jobs a second quality of service identifier indicative of a requested level of quality of service for each node; and allocating the system resources in accordance with the resource allocation plan for ones of the one or more jobs for which the second quality of service identifier corresponds to the first quality of service identifier.

21. The system of claim 20, wherein the computer-readable program instructions are executable by the at least one processing unit for assigning the second quality of service identifier comprising observing an order of the one or more jobs and assigning a number to each of the one or more jobs in accordance with the order, the second quality of service identifier comprising the assigned number and a node identifier.

22. A computer readable medium having stored thereon program code executable by a processor for:

assigning a first quality of service identifier to each of one or more subtasks associated with each node of a compute workflow, the first quality of service identifier indicative of a level of quality of service associated with each node;

assigning a planned resource requirement to each of the one or more subtasks, the planned resource requirement indicative of a total amount of system resources required to complete each of the one or more subtasks;

generating a resource allocation plan for each of the one or more subtasks having the quality of service identifier and the planner resource requirement assigned thereto, the resource allocation plan indicative of a distribution of the system resources over time in at least one resource manager; and outputting the resource allocation plan and the first quality of service identifier to the at least one resource manager for enforcement of the level of quality of service on one or more jobs submitted for each node through at least one workflow orchestrator external to the at least one resource manager, each of the one or more jobs comprising the one or more subtasks.

* * * * *